United States Patent
Kimura et al.

(10) Patent No.: US 9,940,029 B2
(45) Date of Patent: Apr. 10, 2018

(54) SEMICONDUCTOR MEMORY DEVICE THAT SWITCHES BETWEEN STATES AND MOVES DATA IN ACCORDANCE WITH A CURRENT STATE

(71) Applicant: TOSHIBA MEMORY CORPORATION, Minato-ku, Tokyo (JP)

(72) Inventors: Tetsuro Kimura, Tokyo (JP); Tatsunori Kanai, Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 160 days.

(21) Appl. No.: 14/956,455

(22) Filed: Dec. 2, 2015

(65) Prior Publication Data
US 2016/0283114 A1    Sep. 29, 2016

(30) Foreign Application Priority Data
Mar. 23, 2015 (JP) ................... 2015-060063

(51) Int. Cl.
*G06F 13/00* (2006.01)
*G06F 13/40* (2006.01)
*G06F 3/06* (2006.01)

(52) U.S. Cl.
CPC ............ *G06F 3/061* (2013.01); *G06F 3/0659* (2013.01); *G06F 3/0685* (2013.01); *G06F 13/4022* (2013.01)

(58) Field of Classification Search
None
See application file for complete search history.

(56) References Cited

U.S. PATENT DOCUMENTS

| | | | |
|---|---|---|---|
| 7,830,732 B2 | 11/2010 | Moshayedi et al. | |
| 8,607,023 B1 * | 12/2013 | Kraipak | G11C 7/20 711/170 |
| 9,330,736 B2 * | 5/2016 | Michalak | G11C 7/1072 |
| 2014/0040650 A1 * | 2/2014 | Hida | G06F 1/3275 713/324 |
| 2015/0248249 A1 * | 9/2015 | Amidi | G06F 11/1441 711/103 |

FOREIGN PATENT DOCUMENTS

JP    6-250923    9/1994

* cited by examiner

*Primary Examiner* — David E Martinez
(74) *Attorney, Agent, or Firm* — Amin,Turocy & Watson LLP

(57) ABSTRACT

According to an embodiment, a semiconductor memory device includes a first memory, a second memory, a switch, and a controller. The switch switches between various states including between a first state and a second state. In the first state, the first memory is connected to a host device that reads data from and writes data to the first memory and the second memory is not connected to the host device. In the second state, the first memory is connected to the second memory and the host device is connected to neither the first memory nor the second memory. The controller directs, upon receiving a movement command from the host device, the switch to switch to the second state to move data between the first memory and the second memory.

18 Claims, 15 Drawing Sheets

FIG.3

|   | MEMORY AREA IDENTIFICATION INFORMATION ||
| ADDRESS SPACE AREA IDENTIFICATION INFORMATION OR FREE AREA IDENTIFICATION INFORMATION | BLOCK NUMBER | PAGE NUMBER |
| --- | --- | --- |
| 0x8004 | 1 | 1 |
| 0x8013 | 1 | 2 |
| 0x8001 | 1 | 3 |
| 0xFFFF | 1 | 4 |

CORRESPONDENCE INFORMATION

| PROCESS ID | ADDRESS | MEMORY AREA IDENTIFICATION INFORMATION (LOGICAL PAGE NUMBER) |
|---|---|---|
| 495 | 0x8004000 | 1 |
| 495 | 0x8013000 | 2 |
| 495 | 0x8001000 | 3 |
| -1 | 0xFFFFFFFF | 4 |

ADDRESS SPACE AREA IDENTIFICATION INFORMATION (PROCESS ID, ADDRESS)

CORRESPONDENCE INFORMATION

FREE AREA IDENTIFICATION INFORMATION

SEMICONDUCTOR MEMORY DEVICE THAT SWITCHES BETWEEN STATES AND MOVES DATA IN ACCORDANCE WITH A CURRENT STATE

CROSS-REFERENCE TO RELATED APPLICATION

This application is based upon and claims the benefit of priority from Japanese Patent Application No. 2015-060063, filed on Mar. 23, 2015; the entire contents of which are incorporated herein by reference.

FIELD

Embodiments described herein relate generally to semiconductor memory devices.

BACKGROUND

A known technique stores data in excess of a space available on main memory, such as DRAM, in a storage area secured within another storage different from the main memory (often referred to as a swap file) and swaps the data between the main memory and the swap file as needed.

In the known technique, a processor connected to the main memory and the storage via a memory bus performs the swapping.

BRIEF DESCRIPTION OF THE DRAWINGS

FIG. 3 is a diagram illustrating exemplary correspondence information according to the first embodiment;

DETAILED DESCRIPTION

According to an embodiment, a semiconductor memory device includes a first memory, a second memory, a switch, and a controller. The switch switches between various states including between a first state and a second state. The first state is a state in which the first memory is connected to a host device that reads data from and writes data to the first memory and the second memory is not connected to the host device. The second state is a state in which the first memory is connected to the second memory and the host device is connected to neither the first memory nor the second memory. The controller directs, upon receiving a movement command from the host device, the switch to switch to the second state to move data between the first memory and the second memory.

The following details semiconductor memory devices according to embodiments with reference to the accompanying drawings.

First Embodiment

Figure 1:
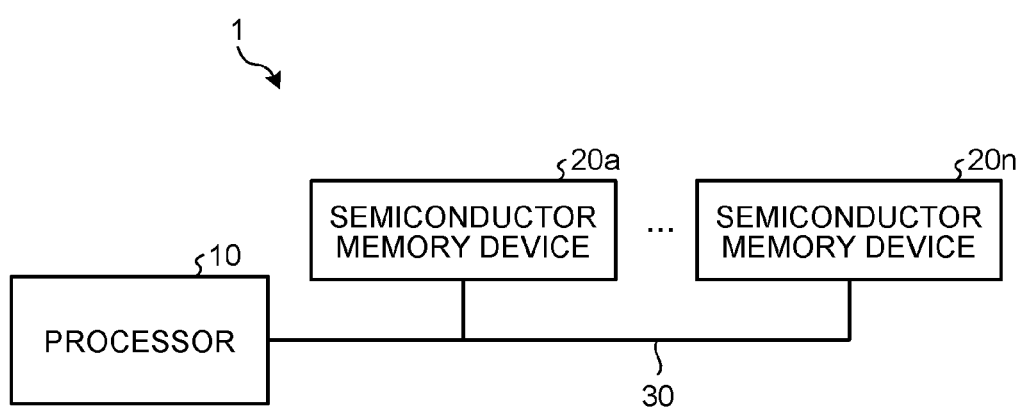
FIG. 1 is a diagram illustrating an exemplary configuration of an information processing apparatus according to a first embodiment.

FIG. 1 is a diagram illustrating an exemplary schematic configuration of an information processing apparatus 1 according to a first embodiment. The information processing apparatus 1 may be configured with, for example, a personal computer (PC), a portable information terminal (including a portable tablet), or a mobile phone terminal. As illustrated in FIG. 1, the information processing apparatus 1 according to the first embodiment includes a processor 10 and a plurality of (n (n≥2) in the example illustrated in FIG. 1) semiconductor memory devices 20a to 20n. The semiconductor memory devices 20a to 20n are each connected to the processor 10 via a memory bus 30.

The processor 10 integrally controls operations of the information processing apparatus 1, and writes data to and reads data from each of the semiconductor memory devices 20a to 20n, for example.

In the first embodiment, at least one of the n semiconductor memory devices 20a to 20n includes two types of semiconductor memories and such a semiconductor memory device may be referred to as a "semiconductor memory device (multiple-memory semiconductor memory device) 20X". A detailed configuration of the semiconductor memory device 20X will be described later. Of the n semiconductor memory devices 20a to 20n, a semiconductor memory device 20 on which only one type of semiconductor memory is mounted is referred to as a "semiconductor memory device (single-memory semiconductor memory device) 20Y" and is differentiated from the multiple-memory semiconductor memory device 20X. The semiconductor memory device 20X and the semiconductor memory device 20Y may not be differentiated from each other and may be collectively referred to simply as a "semiconductor memory device 20".

Figure 2:
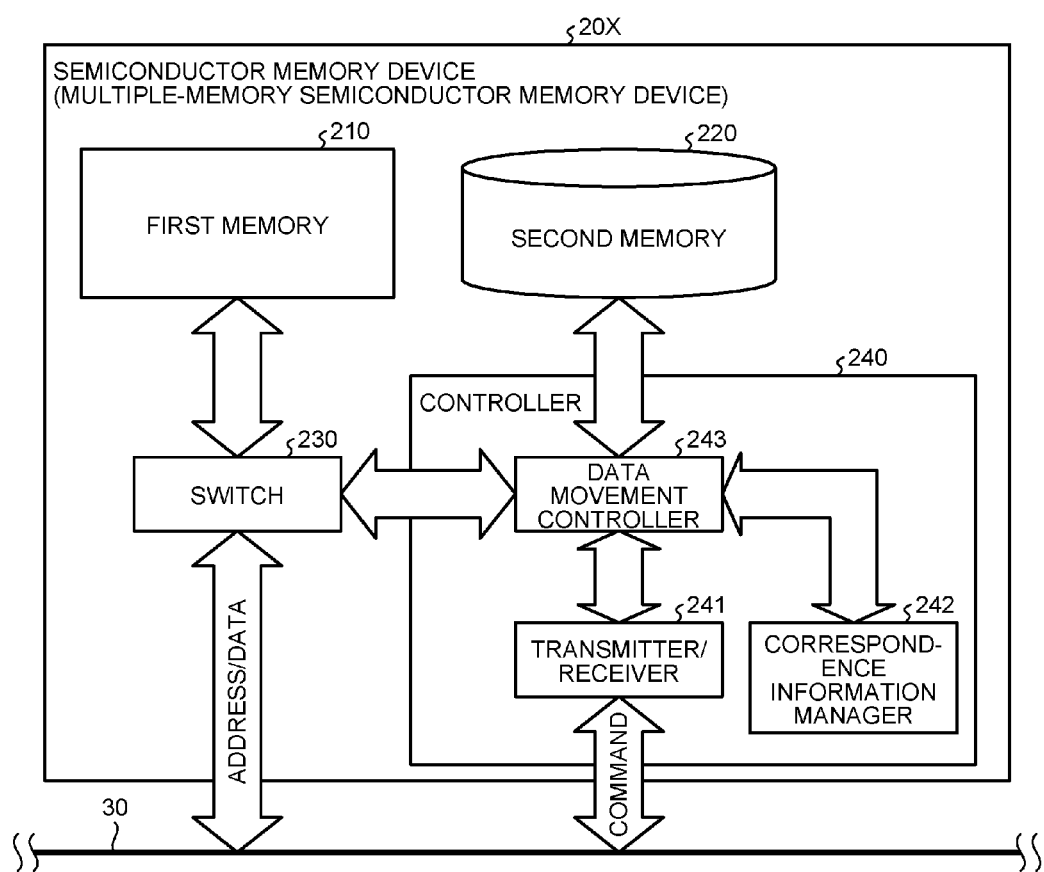
FIG. 2 is a diagram illustrating an exemplary configuration of a semiconductor memory device according to the first embodiment.

FIG. 2 is a diagram illustrating an exemplary hardware configuration of the semiconductor memory device (multiple-memory semiconductor memory device) 20X. As illustrated in FIG. 2, the semiconductor memory device 20X includes a first memory 210, a second memory 220, a switch 230, and a controller 240. These hardware elements are each composed of a semiconductor element or a semiconductor circuit.

The first memory 210 is a memory which the processor 10 as a host device can randomly access; specifically, the first memory 210 permits writing and reading data randomly with respect to any address. Examples of the first memory 210 include, but are not limited to, DRAM and RAM.

The second memory 220 has a storage capacity greater than that of the first memory 210. The second memory 220 may be a non-volatile memory that can retain data for a predetermined period of time or a volatile memory that loses data after a period of time shorter than a predetermined period of time. The second memory 220 may be composed of, for example, a non-volatile memory, such as a NAND or NOR flash memory, a ReRAM, or a phase change memory (PCM) that can retain data for a predetermined period of time after power supply has been shut down. The second memory 220 does not, however, necessarily have to be a non-volatile memory and may be a volatile memory that loses its data after a period of time shorter than a predetermined period of time after the power supply has been shut down.

The switch 230 is a hardware element that switches between various states including between the following two states: a first state in which the first memory 210 is connected to the processor 10 (an exemplary host device) that writes data to and reads data from the first memory 210, and the second memory 220 is not connected to the processor 10; and a second state in which the first memory 210 is connected to the second memory 220 and the processor 10 is connected neither to the first memory 210 nor the second memory 220. The memory is connected to the processor 10 when the processor 10 is in a state of being capable of accessing, and communicating with, the memory. Similarly, the memory is not connected to the processor 10 when the processor 10 is in a state of being incapable of accessing, or communicating with, the memory.

In accordance with the first embodiment, in the first state, the first memory 210 is connected to the memory bus 30 via the switch 230 (connected to the processor 10), so that the processor 10 can access any of a plurality of areas available in the first memory 210 and can specify any area using an address to thereby read data therefrom or write data thereto. In the second state, the first memory 210 is disconnected from the memory bus 30 (not connected to the processor 10), so that the processor 10 is unable to read data from or write data to any area within the first memory 210 even with an address specified.

In the first embodiment, the second memory 220 is not connected to the memory bus 30 (not connected to the processor 10) whether in the first state or the second state, so that the processor 10 is unable to directly access the second memory 220. Thus, the second memory 220 is not allocated to a memory address space in the processor 10.

The controller 240 connected to the memory bus 30, upon receipt from the processor 10 of a movement command that requests movement of data between the first memory 210 and the second memory 220, directs (controls) the switch 230 to switch to the second state, thereby moving the data between the first memory 210 and the second memory 220. As the movement command, at least two kinds of requests are available. The first request indicates (requests) movement of data stored in the first memory 210 to the second memory 220. The second request indicates (requests) movement of data stored in the second memory 220 to the first memory 210. When the first request is received from the processor 10, the controller 240 controls the switch 230 to switch to the second state, to thereby move the data stored in the first memory 210 to the second memory 220. Alternatively, when the second request is received from the processor 10, the controller 240 controls the switch 230 to switch to the second state, to thereby move the data stored in the second memory 220 to the first memory 210. It is noted that the switch 230 is controlled so as to be switched to a desired state when a different state is switched to the desired state and when the desired state, if already established, is not switched.

More specifically, in the first embodiment, the controller 240 includes a correspondence information manager 242. The correspondence information manager 242 stores a plurality of pieces of correspondence information, each piece of correspondence information associating memory area identification information of the second memory 220 with address space area identification information. The memory area identification information of the second memory 220 identifies one specific area out of a plurality of storage areas into which the second memory 220 is divided. The address space area identification information represents identification information for an address space (a virtual address space, for example) accessed by the processor 10, identifying one specific area out of a plurality of divided address space storage areas. When a virtual storage mechanism is operating and a unique address space is allocated to each process, the address space area identification information also includes information that identifies a specific address space to which the area belongs. When the area in the second memory 220 identified by the memory area identification information included in the correspondence information in the first embodiment is a free area, the specific correspondence information indicates information that associates the memory area identification information of the second memory 220 with free area identification information that identifies a free area. The foregoing is, however, not the only possible arrangement and, for example, the free area in the second memory 220 is not registered in the correspondence information and an area not registered in the correspondence information out of a plurality of areas included in the second memory 220 may be managed as being a free area. Additionally, any method may be employed for recording the correspondence information. For example, the correspondence information may be managed in a table format, a list format, or in any other format. The correspondence information manager 242 that stores the correspondence information may be stored in the first memory 210 or the second memory 220, or may be configured using a dedicated memory different from the first memory 210 and the second memory 220. Still alternatively, a table that uses the memory area identification information of the second memory 220 as an index (specifically, the line number of the table representing the memory area identification information of the second memory 220) is compiled and the table may include the address space area identification information. Specifically, the memory area identification information of the second memory 220 and the address space area identification information may be stored in any format as long as the correspondence therebetween is recorded.

FIG. 3 is a diagram illustrating exemplary correspondence information according to the first embodiment. In the example illustrated in FIG. 3, the second memory 220 is configured as a single-chip NAND flash memory and the memory area identification information of the second memory 220 includes a combination (that corresponds to a physical address) of a block number that identifies a specific block out of a plurality of blocks within the chip (each block is composed of a plurality of pages) and a page number that identifies a specific page within the block identified by the block number. Each piece of the memory area identification information of the second memory 220 is associated with the virtual address space area identification information ("0x8004", "0x8013", and "0x8001" in the example illustrated in FIG. 3) or the free area identification information ("0xFFFF" in the example illustrated in FIG. 3). It is noted that, when the second memory 220 is configured as a plurality of NAND flash memory chips, the memory area identification information may further include a chip number that identifies a specific chip out of the chips. When the area in the second memory 220 identified by the memory area identification information of the second memory 220 indicates an area of a plurality of consecutive pages within an identical block, the memory area identification information may further include information that indicates the number of pages in addition to information that identifies a starting page (a block number and a page number). Alternatively, when the area in the second memory 220 identified by the memory area identification information of the second memory 220 represents an area composed of pages across a plurality of blocks, the memory area identification information may include all combinations of block numbers and page numbers (and information that identifies the number of pages). Still alternatively, instead of physical information composed of a combination of a block number and a page number (and a chip number), a specific area within the second memory 220 may be specified (identified) by logical information (for example, serial one-dimensional page numbers). Specifically, the semiconductor memory device 20X may include a conversion mechanism that maps a logical one-dimensional page number to physical information (for example, a combination of a block number and a page number (and a chip number)).

Reference is made back to FIG. 2 and the controller 240 will further be described. In the first embodiment, the first request and the second request each include, as parameters (also referred to as arguments), memory area identification information of the first memory 210 (a first parameter) and the address space area identification information (a second parameter). The memory area identification information of the first memory 210 identifies a specific area out of a plurality of areas included in the first memory 210.

In the first embodiment, when the first request is received, the controller 240 finds (identifies) a free area in the second memory 220. The controller 240 then moves data stored in the area in the first memory 210 identified by the first parameter of the first request to the free area in the second memory 220 thus identified. The controller 240 next updates the correspondence information by associating the address space area identification information as the second parameter of the first request with the memory area identification information that identifies the destination area in the second memory 220 to which the data has been moved. In contrast, when the second request is received, the controller 240 first refers to the correspondence information and finds (identifies) the memory area identification information of the second memory 220 that is associated with the address space area identification information as the second parameter of the second request. The controller 240 then moves data stored in the area in the second memory 220 identified by the memory area identification information of the second memory 220 thus identified to the area in the first memory 210 identified by the first parameter of the second request. The controller 240 then manages the area in the second memory 220 from which the data has been moved as a free area.

More specifically, when the first request is received, the controller 240 first refers to the correspondence information and identifies the memory area identification information associated with the free area identification information. The controller 240 then moves the data stored in the area in the first memory 210 identified by the first parameter of the first request to the area in the second memory 220 identified by the memory area identification information of the second memory 220 thus identified. The controller 240 next updates the correspondence information by associating the address space area identification information as the second parameter of the first request with the memory area identification information that identifies the destination area in the second memory 220 to which the data has been moved. In contrast, when the second request is received, the controller 240 refers to the correspondence information and identifies the memory area identification information of the second memory 220 that is associated with the address space area identification information as the second parameter of the second request. The controller 240 then moves the data stored in the area in the second memory 220 identified by the memory area identification information thus identified to the area in the first memory 210 identified by the first parameter of the second request. The controller 240 then updates the correspondence information by associating the free area identification information with the memory area identification information that identifies the area in the second memory 220 to which the data has been moved.

The first request, as the term is used herein, may be considered as a command that requests data stored in the first memory 210 to be saved in the second memory 220 and thus may be referred to as a "save command". The second request, as the term is used herein, may be considered as a command that requests data stored in the second memory 220 to be returned to the first memory 210 and thus may be referred to as a "return command". Additionally, the movement command may even be a combined command that first requests data stored in a predetermined area in the first memory 210 to be saved in the second memory 220 and then requests data stored in, within the second memory 220, another area different from the area in which the saved data is stored to be returned to the predetermined area in the first memory 210 (a command that associates and combines the save command with the return command).

Types of commands received from the processor 10 by the controller 240 may include, in addition to the above-described movement commands, an information acquiring command for acquiring a state of the semiconductor memory device 20X. Examples of states of the semiconductor memory device 20X to be acquired include, but are not limited to, whether the processor 10 can access the first memory 210 (to be determined by acquiring the state of the switch 230), capacity of free areas available in the second memory 220, and progress of data movement between the first memory 210 and the second memory 220 and an estimated period of time left before the data movement is completed.

In addition, the controller 240 may receive from the processor 10 a command that releases the area in the second memory 220 identified by the memory area identification information associated with the address space area identification information, in other words, a command that requests to change the state of the address space area identification information into a state in which no address space area identification information is allocated (a non-allocated state) (a delete command). The controller 240 may even receive from the processor 10 a command that requests to change the state of all areas contained in the second memory 220 into a non-allocated state (an initializing command).

Command parameters (for example, the first parameter and the second parameter as the parameters of the save command and the return command) may be assigned as attached to the command. Alternatively, the command parameters may be written in advance in a register within the semiconductor memory device 20X and information indicating an operation type may be given as a command. In this case, a command writes a parameter in the register within the multiple-memory semiconductor memory device 20X.

Although the area in the first memory 210 identified by the first parameter of the save command or the return command is preferably a fixed-length area, an unfixed-length area may be identified using, for example, a starting address and an ending address, or a starting address and size. For a fixed length, the area size is preferably in 4 KB used commonly for the virtual storage of an operating system (OS) on the processor 10 or in units of writing data (pages in the NAND flash memory) in the second memory 220, but are not limited thereto and may be in any unit. In addition, the area in the first memory 210 identified by the above-described first parameter may be a plurality of serial fixed-length areas. The example will be described under the assumption that the area in the first memory 210 identified by the first parameter is one fixed-length area.

The following describes even more specific configurations of the controller 240. As illustrated in FIG. 2, the controller 240 includes a transmitter/receiver 241, the correspondence information manager 242, and a data movement controller 243.

The transmitter/receiver 241 receives a command from the processor 10 and transmits a response to the received command to the processor 10. In the example illustrated in FIG. 2, the transmitter/receiver 241 is connected to the memory bus 30 and can receive a command from the processor 10 and transmit a response to the processor 10 regardless of whether the switch 230 (the semiconductor memory device 20X) is in the first state or the second state.

The correspondence information manager 242 manages the correspondence information. When, for example, the transmitter/receiver 241 receives a save command, the correspondence information manager 242 refers to the correspondence information to thereby identify the memory area identification information of the second memory 220 associated with the free area identification information and notifies the data movement controller 243 of the memory area identification information thus identified. Alternatively, when the transmitter/receiver 241 receives a return command, the correspondence information manager 242 refers to the correspondence information to thereby identify the memory area identification information of the second memory 220 associated with the address space area identification information that is the second parameter of the return command and notifies the data movement controller 243 of the memory area identification information thus identified.

The following describes operations when the transmitter/receiver 241 receives a delete command. A parameter of the delete command has the address space area identification information. The correspondence information manager 242 selects, out of the correspondence information, the memory area identification information of the second memory 220 associated with the address space area identification information of the delete command parameter and associates the thus selected memory area identification information with the free area identification information. If the free area identification information is not to be registered in the correspondence information as a method for managing the free area, the correspondence information that associates the selected memory area identification information with the address space area identification information needs only to be deleted.

When this multiple-memory semiconductor memory device 20X is to be used for the first time, its default state is that no data is saved in the second memory 220, which requires a state in which the address space area identification information is not registered in the correspondence information. When the transmitter/receiver 241 receives an initializing command, therefore, the correspondence information manager 242 performs initialization, specifically, associates all pieces of the memory area identification information of the second memory 220 with the free area identification information.

The following describes the data movement controller 243. The data movement controller 243 determines the type of the command received by the transmitter/receiver 241 and performs control according to the received command. When a movement command is received, data is moved between the first memory 210 and the second memory 220 according to the movement command. When, for example, the transmitter/receiver 241 receives a save command and when the data movement controller 243 is notified of the memory area identification information of the second memory 220 from the correspondence information manager 242 (specifically, a notification of information that indicates a free area in the second memory 220 identified by the correspondence information manager 242), the data movement controller 243 controls the switch 230 to switch to the second state. Thereafter, the data movement controller 243 moves the data stored in the area in the first memory 210 identified by the first parameter of the save command to the area in the second memory 220 identified by the notified memory area identification information. The data movement controller 243 further requests the correspondence information manager 242 to update the correspondence information. Upon receipt of the request, the correspondence information manager 242 updates the correspondence information by associating the address space area identification information as the second parameter of the save command with the memory area identification information that identifies the area in the second memory 220 identified as a free area.

When, for example, the transmitter/receiver 241 receives a return command and when the data movement controller 243 is notified of the memory area identification information of the second memory 220 from the correspondence information manager 242 (specifically, a notification of the memory area identification information of the second memory 220 identified by the correspondence information manager 242 and associated with the address space area identification information as the second parameter of the return command), the data movement controller 243 controls the switch 230 to switch to the second state. Thereafter, the data movement controller 243 moves the data stored in the area in the second memory 220 identified by the notified memory area identification information to the area in the first memory 210 identified by the first parameter of the return command. The data movement controller 243 further requests the correspondence information manager 242 to update the correspondence information. Upon receipt of the request, the correspondence information manager 242 updates the correspondence information by associating, instead of the address space area identification information as the second parameter of the return command, the free area identification information with the memory area identification information of the second memory 220 associated with the address space area identification information.

It is noted that, in the first embodiment, the controller 240 does not transmit a response immediately after it receives a movement command from the processor 10; instead, the controller 240 causes the data to be moved between the first memory 210 and the second memory 220 in accordance with the received movement command and, after the data has been moved, notifies the processor 10 that the movement of data is completed in response to the movement command. This is not, however, the only possible arrangement.

For example, the controller 240 may first transmits the response to the processor 10 after it has received the movement command and then start the movement of data. The response to be made in this case may be appended with a result of a determination made as to whether a parameter of the movement command is correct, as determined through an inspection of the memory area identification information of the second memory 220 and the address space memory area identification information corresponding to the parameter.

Alternatively, the controller 240 may, without responding to the movement command, return information that allows whether data is being moved to be determined in response to an information acquiring command received from the processor 10. For example, the controller 240 may return information that indicates whether the switch 230 is in the first state or the second state to the processor 10 in response to the information acquiring command. If the switch 230 is in the second state, the processor 10 can determine that the data is being moved and, if the switch 230 is in the first state, the processor 10 can determine that the movement of data is completed.

Still alternatively, the processor 10 may even try to access the first memory 210 without confirming the completion of movement of data between the memories and determine whether the data is being moved on the basis of whether the first memory 210 can be accessed normally. When the switch 230 is in the first state, specifically, when the processor 10 is connected to the first memory 210, access can be normally made to the first memory 210; when the switch 230 is in the second state, specifically, when the processor 10 is not connected to the first memory 210, the processor 10 is unable to access the first memory 210. An arrangement may therefore be made in which, when the access is disabled, an error is returned or no response is returned within a predetermined period of time to the processor 10.

The multiple-memory semiconductor memory device 20X is configured as described above. It is noted that the single-memory semiconductor memory device 20Y does include the first memory 210, but not the second memory 220, the switch 230, or the controller 240.

Figure 4:
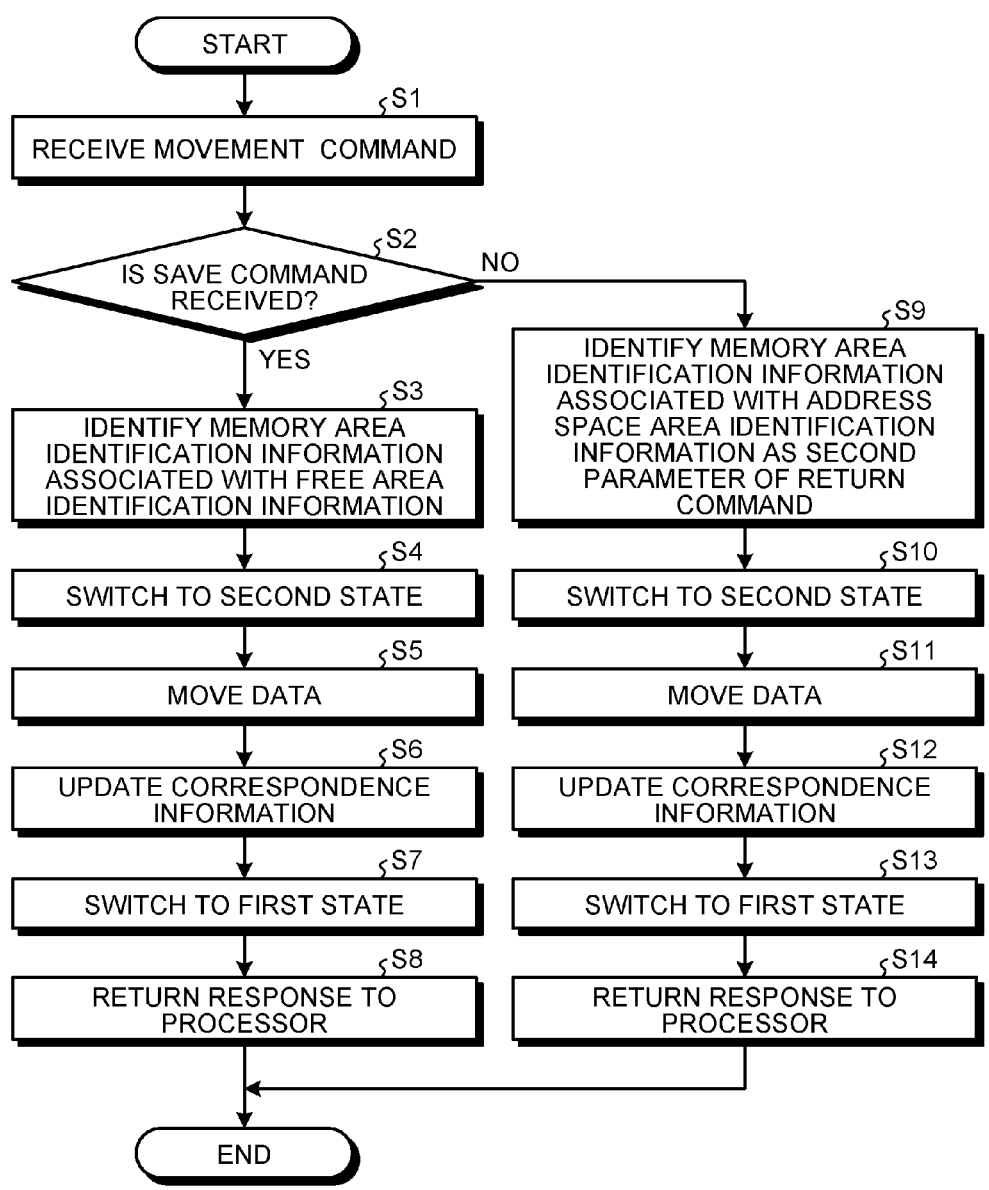
FIG. 4 is a flowchart illustrating exemplary operations performed by a controller according to the first embodiment.

FIG. 4 is a flowchart illustrating exemplary operations performed by the controller 240 when the controller 240 receives a movement command (a save command or a return command) from the processor 10. The transmitter/receiver 241 receives the movement command (Step S1). If the received movement command is a save command (Yes at Step S2), the correspondence information manager 242 refers to the correspondence information to thereby identify the memory area identification information associated with the free area identification information (Step S3) and notifies the data movement controller 243 of the memory area identification information thus identified. Upon receipt of the notification, the data movement controller 243 controls the switch 230 to switch to the second state (Step S4) and moves data stored in the area in the first memory 210 identified by the first parameter of the save command to the area in the second memory 220 identified by the memory area identification information notified from the correspondence information manager 242 (Step S5). The data movement controller 243 then requests the correspondence information manager 242 to update the correspondence information. Upon receipt of this request, the correspondence information manager 242 updates the correspondence information by associating the address space area identification information as the second parameter of the save command with the memory area identification information that identifies the area in the second memory 220 identified as a free area (Step S6). The data movement controller 243 next controls the switch 230 to switch to the first state (Step S7). The transmitter/receiver 241 then notifies the processor 10 that the movement of the data has been completed in response to the save command (Step S8).

If the movement command received at Step S1 is a return command (No at Step S2), the correspondence information manager 242 refers to the correspondence information to thereby identify the memory area identification information associated with the address space area identification information as the second parameter of the return command (Step S9) and notifies the data movement controller 243 of the memory area identification information thus identified. Upon receipt of the notification, the data movement controller 243 controls the switch 230 to switch to the second state (Step S10) and moves data that is stored in the area in the second memory 220 identified by the memory area identification information notified from the correspondence information manager 242 to the area in the first memory 210 identified by the first parameter of the return command (Step S11). The data movement controller 243 then requests the correspondence information manager 242 to update the correspondence information. Upon receipt of this request, the correspondence information manager 242 updates the correspondence information by associating the free area identification information with the memory area identification information associated with the address space area identification information as the second parameter of the return command (Step S12). The data movement controller 243 next controls the switch 230 to switch to the first state (Step S13). The transmitter/receiver 241 then notifies the processor 10 that the movement of the data has been completed in response to the return command (Step S14).

Figure 5:
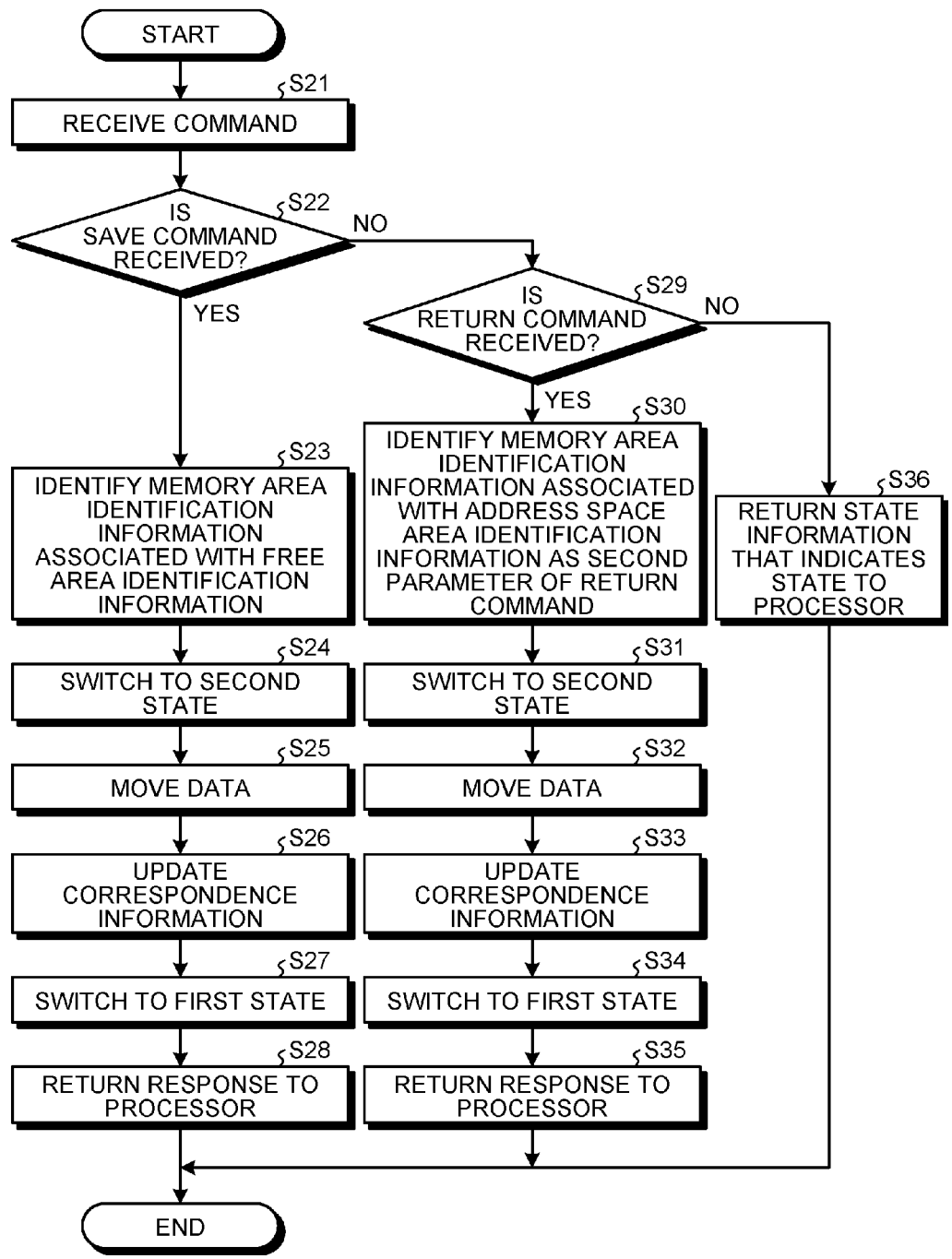
FIG. 5 is a flowchart illustrating exemplary operations performed by a controller according to a modification.

FIG. 5 is a flowchart illustrating exemplary operations performed by the controller 240 when the controller 240 receives from the processor 10 a command that is categorized into any of the three types: save command, return command, and information acquiring command. The transmitter/receiver 241 receives a command (Step S21). If the received command is a save command (Yes at Step S22), operations of Step S23 to Step S28 are performed. Details of the operations performed at Step S23 to Step S28 are the same as those of the operations performed at Step S3 to Step S8 illustrated in FIG. 4. If the command received by the transmitter/receiver 241 is a return command (Yes at Step S29), operations of Step S30 to Step S35 are performed. Details of the operations performed at Step S30 to Step S35 are the same as those of the operations performed at Step S9 to Step S14 illustrated in FIG. 4.

If the command received by the transmitter/receiver 241 is an information acquiring command (No at Step S29), the transmitter/receiver 241 returns, as a response, state information that indicates the current state of the switch 230 (the state of the semiconductor memory device 20X) to the processor 10 (Step S36).

Figure 6:
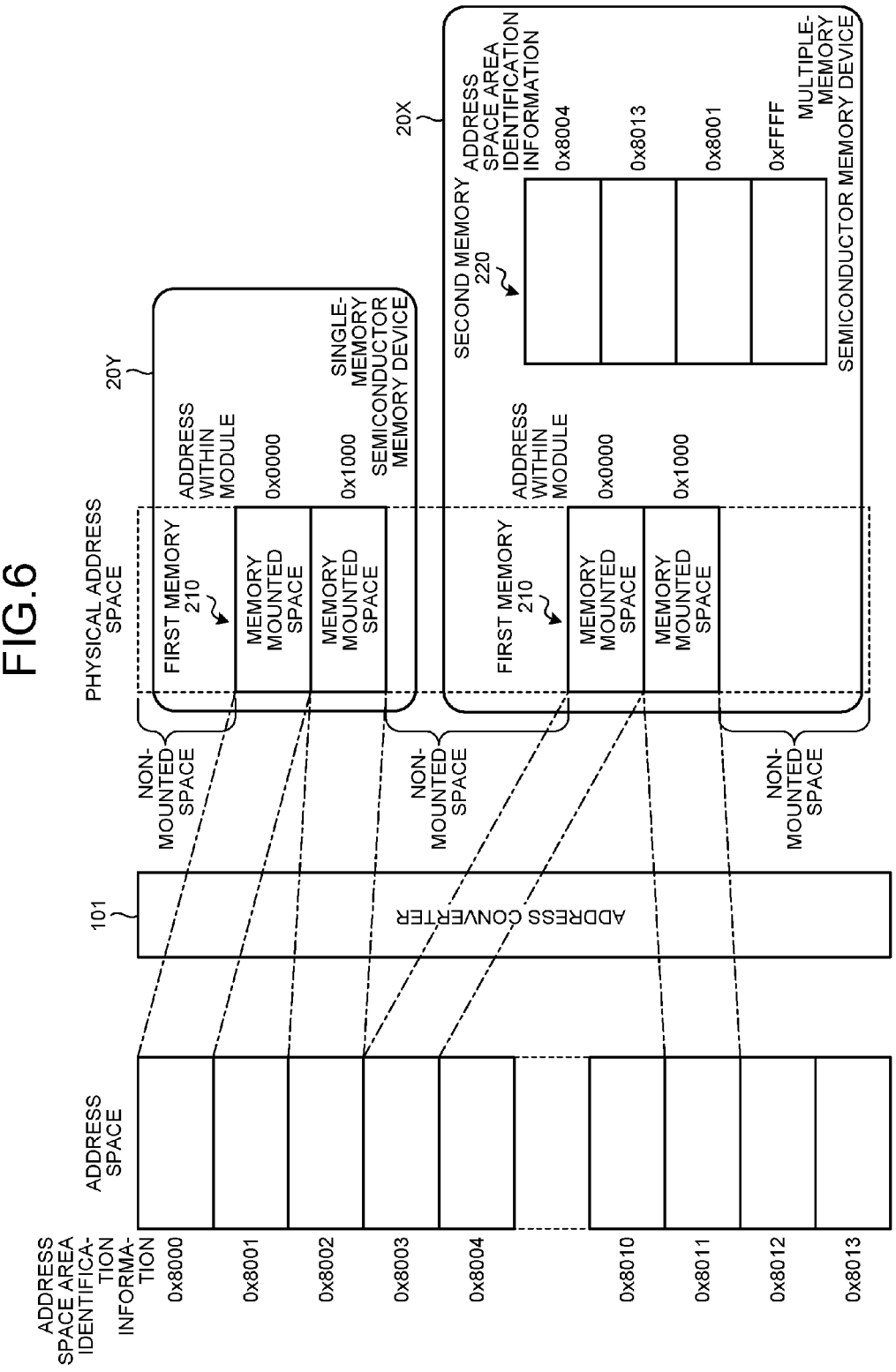
FIG. 6 is a diagram for illustrating specific exemplary operations performed by the information processing apparatus according to the first embodiment.

The following specifically describes, with reference to FIG. 6, general operations of the information processing apparatus 1. In the example illustrated in FIG. 6, the address space accessed by the processor 10 is managed as a collection of consecutive pages delimited by a fixed-length area and the address space area identification information (a space identifier) is assigned to each page. The address space area identification information may be configured, for example, as a combination of a process ID that identifies a process and high-order bits excluding a predetermined number of low-order bits of a virtual address that identifies an area in a virtual address space allocated to the process. This is, however, not the only possible arrangement. The address space area identification information is required only to allow the area in the address space accessed by the processor 10 to be identified.

The address space accessed by the processor 10 has a capacity greater than a capacity of the first memory 210 mounted on the semiconductor memory device 20. Thus, only part of the pages of the address space is allocated to the first memory 210 with the remaining pages saved in the second memory 220 mounted on the multiple-memory semiconductor memory device 20X or a storage device, such as an HDD and an SSD. The first memory 210 mounted on the semiconductor memory device 20 is fixedly allocated to a physical address space. For the multiple-memory semiconductor memory device 20X, only the first memory 210 is allocated to the physical address space. The second memory 220 is not allocated to the physical address space because the processor 10 is unable to access the second memory 220 as described earlier. The processor 10 has a function of allocating address space pages to the physical address space (an address converter 101). This function is commonly referred to as a memory manager, for example.

In the example illustrated in FIG. 6, the function of the address converter 101 causes, out of a plurality of pages (exemplary areas) included in the address space, a page to which the address space area identification information (space identifier) that indicates "0x8000" is given and a page to which the address space area identification information that indicates "0x8002" is given to be allocated to the first memory 210 mounted on the single-memory semiconductor memory device 20Y, and causes a page to which the address space area identification information that indicates "0x8003" is given and a page to which the address space area identification information that indicates "0x8011" is given to be allocated to the first memory 210 mounted on the multiple-memory semiconductor memory device 20X.

Additionally, in the example illustrated in FIG. 6, the function of the address converter 101 causes a page to which the address space area identification information that indicates "0x8004" is given, a page to which the address space area identification information that indicates "0x8013" is given, and a page to which the address space area identification information that indicates "0x8001" is given to be allocated to (saved in) the second memory 220 mounted on the multiple-memory semiconductor memory device 20X. Of a plurality of areas included in the second memory 220, the area associated with the free area identification information that indicates "0xFFFF" indicates a free area. In the example illustrated in FIG. 6, of the pages included in the address space, a page to which the address space area identification information that indicates "0x8010" is given, a page to which the address space area identification information that indicates "0x8012" is given, and other pages not illustrated are unused pages that are not allocated to any memory.

The following describes operations performed when software that runs on the processor 10 accesses an address within, out of the pages included in the address space, a page to which the address space area identification information that indicates "0x8013" assigned to the second memory 220 as a saving destination is given. In this case, because no physical address corresponding to the address accessed by the software exists, the address converter 101 issues a page fault interrupt to the processor 10. The operating system (OS) that runs on the processor 10 follows a predetermined algorithm to select, from among the pages of the address space allocated to the first memory 210, a page to be saved. The following is based on the assumption that the page to which the address space area identification information that indicates "0x8003" is given has been selected as the page to be saved.

To save the page to which the address space area identification information that indicates "0x8003" is given, the OS transmits a save command to the multiple-memory semiconductor memory device 20X. As parameters of the save command, a first parameter that identifies a saving area in the first memory 210 and a second parameter that indicates the address space area identification information are specified. To specify the saving area in the first memory 210, for example, a starting address of addresses in the multiple-memory semiconductor memory device 20X may be specified. In this example, therefore, "0x0000" is specified as the starting address of the addresses in the multiple-memory semiconductor memory device 20X of, out of a plurality of areas included in the first memory 210, the area to which the page to which the virtual address space area identification information that indicates "0x8003" is given is allocated. For the second parameter, the address space area identification information is specified that indicates "0x8003" given to the page of the address space to which the saving area in the first memory 210 is allocated.

The multiple-memory semiconductor memory device 20X that receives the save command operates in accordance with the flowchart illustrated in FIG. 4. Specifically, when the transmitter/receiver 241 receives a save command (Yes at Step S2), the correspondence information manager 242 refers to the correspondence information to thereby identify the memory area identification information associated with the free area identification information that indicates "0xFFFF" (Step S3) and notifies the data movement controller 243 of the memory area identification information thus identified. Upon receipt of the notification, the data movement controller 243 controls the switch 230 to switch to the second state (Step S4) and moves data for one page stored in the area in the first memory 210 having a starting address of "0x0000" indicated by the first parameter of the save command to the area in the second memory 220 identified by the memory area identification information notified from the correspondence information manager 242 (Step S5). The data movement controller 243 then requests the correspondence information manager 242 to update the correspondence information. Upon receipt of this request, the correspondence information manager 242 updates the correspondence information by associating "0x8003" indicated by the second parameter of the save command with the memory area identification information that identifies the saving area (the area identified as a free area at Step S3) out of the areas included in the second memory 220 (Step S6). The data movement controller 243 next controls the switch 230 to switch to the first state (Step S7). The transmitter/receiver 241 then notifies the processor 10 that the movement of the data has been completed in response to the save command (Step S8).

To return the page that includes the address that has caused a page fault, the OS transmits a return command to the multiple-memory semiconductor memory device 20X. For parameters of the return command, a first parameter that identifies an area in the first memory 210 to which the page is to be returned and a second parameter that indicates the address space area identification information are specified. The area in the first memory 210 to which the page is to be returned is identical to the area in the first memory 210 identified by the first parameter of the corresponding save command. Thus, "0x0000" is specified as the starting address of the addresses in the multiple-memory semiconductor memory device 20X. For the second parameter, the address space area identification information that indicates "0x8013" given to the page that includes the address that has caused the page fault is specified.

The multiple-memory semiconductor memory device 20X that receives the return command operates in accordance with the flowchart illustrated in FIG. 4. Specifically, if the transmitter/receiver 241 receives a return command (No at Step S2), the correspondence information manager 242 refers to the correspondence information to thereby identify the memory area identification information associated with "0x8013" indicated by the second parameter of the return command (Step S9) and notifies the data movement controller 243 of the memory area identification information thus identified. Upon receipt of the notification, the data movement controller 243 controls the switch 230 to switch to the second state (Step S10) and moves data for one page that is stored in the area in the second memory 220 identified by the memory area identification information notified from the correspondence information manager 242 to the area in the first memory 210 having a starting address of "0x0000" indicated by the first parameter of the return command (Step S11). The data movement controller 243 then requests the correspondence information manager 242 to update the correspondence information. Upon receipt of this request, the correspondence information manager 242 updates the correspondence information by associating the free area identification information that indicates "0xFFFF" with the memory area identification information associated with "0x8013" indicated by the second parameter of the return command (Step S12). The data movement controller 243 next controls the switch 230 to switch to the first state (Step S13). The transmitter/receiver 241 then notifies the processor 10 that the movement of the data has been completed in response to the return command (Step S14). The processor 10, upon receipt of this notification, changes mapping information used in the address conversion by the address converter 101 to thereby ensure that, of the pages included in the address space, the specific page that includes the address that has caused the page fault is allocated to the returned area in the first memory 210 mounted on the multiple-memory semiconductor memory device 20X.

The performance of the foregoing operations allows the software that has developed the page fault to access the address within the page to which the address space area identification information indicating "0x8013" is given, so that the software can continue processing.

As described above, the semiconductor memory device 20X according to the first embodiment includes the first memory 210 and the second memory 220 mounted thereon. The semiconductor memory device 20X further includes the switch 230 that switches between the first state in which the first memory 210 is connected to the processor 10 and the second memory 220 is not connected to the processor 10 and the second state in which the first memory 210 and the second memory 220 are connected to each other and the processor 10 is connected to neither the first memory 210 nor the second memory 220.

The semiconductor memory device 20X according to the first embodiment further includes the controller 240 that, after having received a movement command for requesting movement of data between the first memory 210 and the second memory 220, controls the switch 230 to switch to the second state, thereby moving the data between the first memory 210 and the second memory 220. This arrangement releases the processor 10 from movement of data between the first memory 210 and the second memory 220, so that load on the processor 10 can be reduced. In addition, the controller 240 moves the data between the first memory 210 and the second memory 220 with the first memory 210 disconnected from the memory bus 30 (in a condition in which the first memory 210 is not connected to the processor 10), during which time the processor 10 can use the memory bus 30 freely. The processor 10 thus can, for example, even access another semiconductor memory device 20 via the memory bus 30. Furthermore, the semiconductor memory device 20X according to the first embodiment, including both the first memory 210 and the second memory 220 mounted thereon, can shorten time required for moving data between the first memory 210 and the second memory 220. In the first embodiment, therefore, considerable degradation in performance of the information processing apparatus 1 can be avoided even when movement of data between the first memory 210 and the second memory 220 frequently occurs.

Modification of First Embodiment

In the first embodiment, the OS on the processor 10 issues a save command and waits for the save command to be completed before transmitting a subsequent return command. These two events are, in many cases, operatively associated with each other and it is convenient to issue the save command and the return command consecutively and wait for only the last command to be completed. A modification of the first embodiment represents a configuration that enables consecutive issuance of a save command and a return command and of sets of save commands and respective return commands for a plurality of pages. The following describes only differences from the first embodiment described above.

Figure 7:
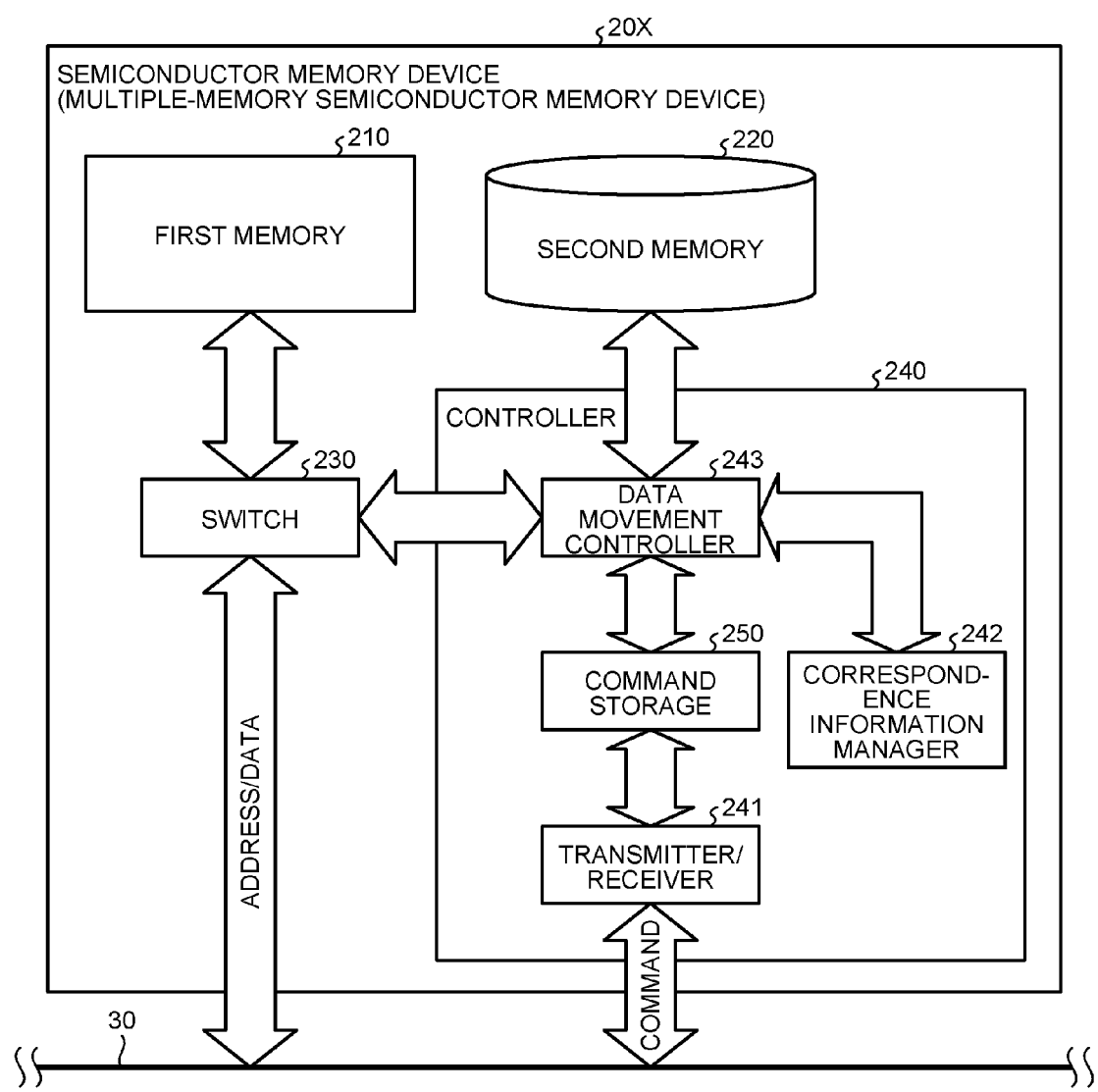
FIG. 7 is a diagram illustrating an exemplary configuration of a semiconductor memory device according to a modification of the first embodiment.

As illustrated in FIG. 7, the semiconductor memory device (multiple-memory semiconductor memory device) 20X according to the modification of the first embodiment further includes a command storage 250 that stores therein movement commands received from the processor 10 in order of reception, so that the controller 240 fetches the movement commands stored in the command storage 250 one by one to thereby perform the control according to the fetched movement command. In the modification of the first embodiment, the controller 240 fetches the movement commands one by one, starting with the first one from the command storage 250, but the fetching order is not limited thereto. In the modification of the first embodiment, the command storage 250 has a data structure called queue by which information that first stored is retrieved first. By queue, the movement command (the save command or the return command) is registered in order of reception. Information required for executing the movement command (e.g., information that indicates the type of commands and the above-described parameters) is registered in the command storage 250. The information may be managed in a table format or a list format. The command storage 250, though disposed inside the controller 240 in the example illustrated in FIG. 7, may, for example, be disposed outside the controller 240.

For convenience sake, the modification of the first embodiment will be described for a case in which the types of commands received from the processor 10 by the controller 240 include the information acquiring command, in addition to the movement commands (the save command and the return command). State information to be acquired includes, but is not limited to, whether the first memory 210 is accessible (specifically, the state of the switch 230), capacity of free areas in the second memory 220, progress of movement of data between the first memory 210 and the second memory 220 and an estimated period of time left before completion, the number of movement commands left in the command storage 250, and capacity of free areas in the command storage 250 (that corresponds to information for determining how many more movement commands can be accepted).

The transmitter/receiver 241, after having received a command from the processor 10, returns a response to the reception of the command to the processor 10, when the received command is a movement command, and registers the received movement command at the end of the command storage 250. When an information acquiring command is received from the processor 10, the transmitter/receiver 241 does not register the received information acquiring command in the command storage 250 and returns, in response thereto, state information that indicates a current state of the switch 230 (state of the semiconductor memory device 20X) to the processor 10.

The data movement controller 243 moves data between the first memory 210 and the second memory 220 in accordance with a starting movement command (the movement command received first) out of one or more movement commands registered in the command storage 250. Specific details of operations involved here are similar to those in the first embodiment described above. In a configuration, for example, in which a plurality of chips exist for the first memory 210 or the second memory 220 to enable processing of a plurality of movement commands in parallel with each other, the movement commands may be processed in parallel.

Figure 8:
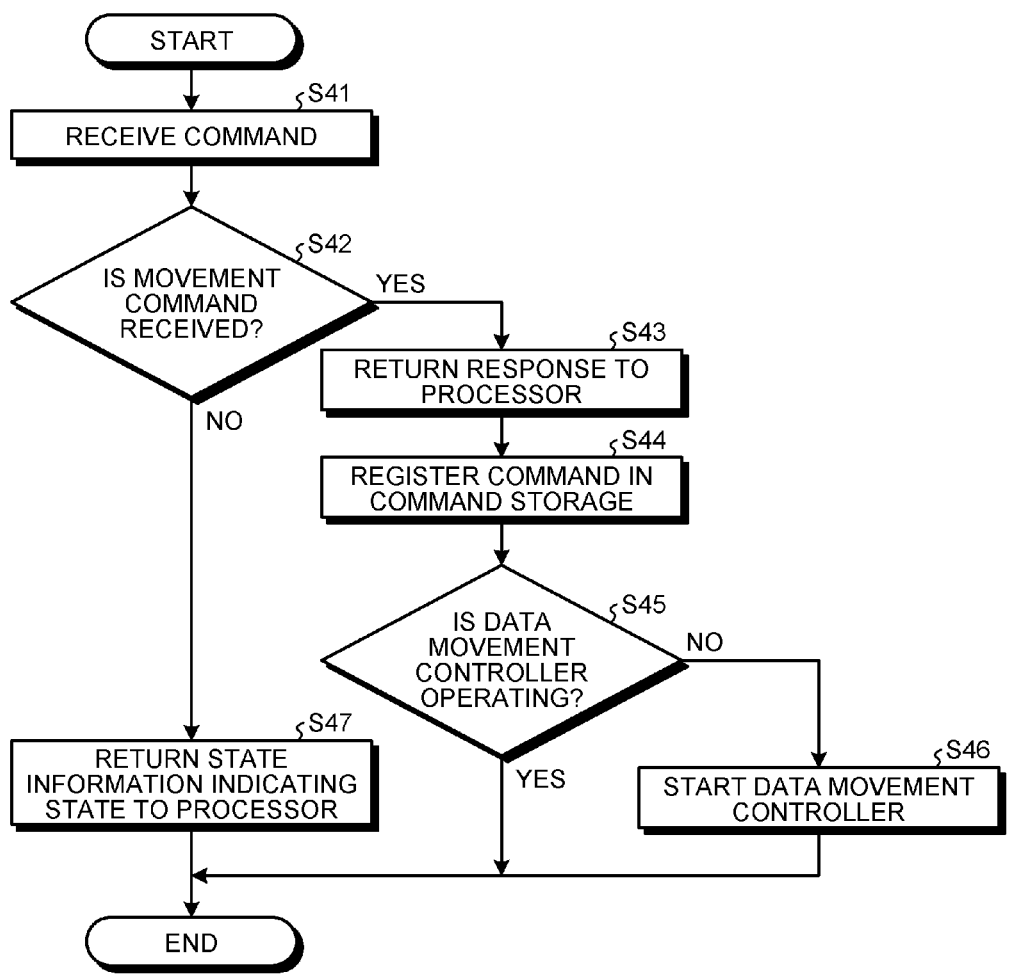
FIG. 8 is a flowchart illustrating exemplary operations performed by a transmitter/receiver according to the modification.

FIG. 8 is a flowchart illustrating exemplary operations performed by the transmitter/receiver 241 when the transmitter/receiver 241 receives a command from the processor 10. When a command is received from the processor 10 (Step S41), the transmitter/receiver 241 determines the type of the received command. The type of the received command can be determined in various ways. For example, when the command received from the processor 10 includes command type information that indicates the type of the command, the transmitter/receiver 241 refers to the command type information included in the received command to thereby determine the type of the received command.

If it is determined that the command received at Step S41 is a movement command (Yes at Step S42), specifically, if the command received at Step S41 is a save command or a return command, the transmitter/receiver 241 returns information that indicates that a movement command has been received to the processor 10 as a response (Step S43). The transmitter/receiver 241 next registers the received movement command in the command storage 250 (Step S44). The transmitter/receiver 241 then determines whether the data movement controller 243 is operating (Step S45). If it is determined that the data movement controller 243 is operating (Yes at Step S45), the operation is directly terminated. If it is determined that the data movement controller 243 is not operating (No at Step S45), the data movement controller 243 is started (Step S46).

If it is determined that the command received at Step S41 is not a movement command (No at Step S42), specifically, if the command received at Step S41 is an information acquiring command, the transmitter/receiver 241 returns state information that indicates the state of the semiconductor memory device 20X (state of the switch 230) to the processor 10 (Step S47) as a response.

Figure 9:
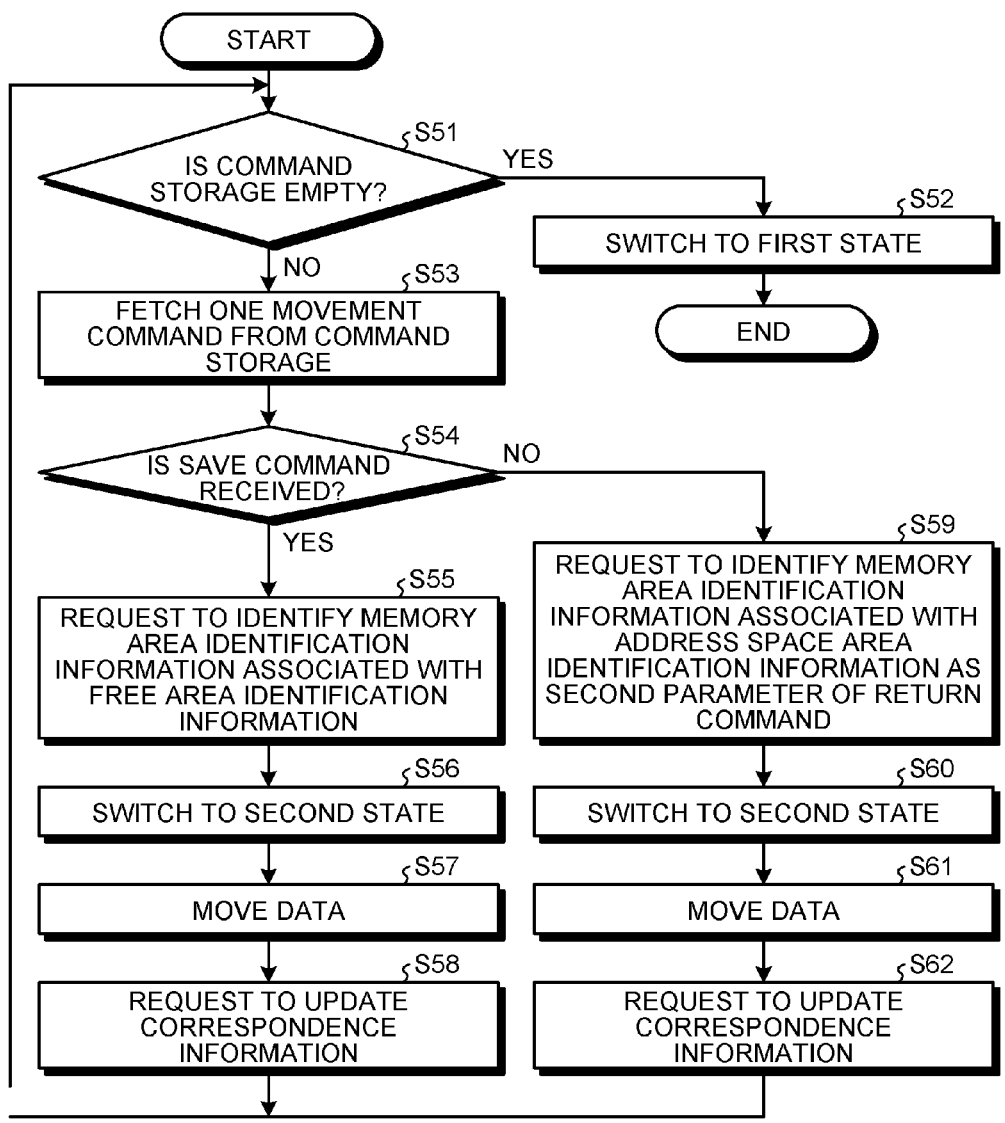
FIG. 9 is a flowchart illustrating exemplary operations performed by a data movement controller according to the modification.

The following describes, with reference to FIG. 9, exemplary operations performed by the data movement controller 243 according to the modification of the first embodiment. The data movement controller 243 determines whether the command storage 250 is empty (Step S51). If it is determined that the command storage 250 is empty (Yes at Step S51), the data movement controller 243 controls the switch 230 to switch to the first state (Step S52).

If it is determined that the command storage 250 is not empty (No at Step S51), the data movement controller 243 fetches one movement command from the command storage 250 (Step S53). More specifically, the data movement controller 243 fetches the starting movement command out of the one or more movement commands stored in the command storage 250.

If the movement command fetched at Step S53 is a save command (Yes at Step S54), the data movement controller 243 requests the correspondence information manager 242 to identify memory area identification information associated with the free area identification information (Step S55). Upon receipt of this request, the correspondence information manager 242 refers to the correspondence information to thereby identify the memory area identification information associated with the free area identification information and notifies the data movement controller 243 of the memory area identification information thus identified. Upon receipt of this notification, the data movement controller 243 controls the switch 230 to switch to the second state (Step S56) and moves data stored in the area in the first memory 210 identified by the first parameter of the save command to the area in the second memory 220 identified by the memory area identification information notified from the correspondence information manager 242 (Yes at Step S57). The data movement controller 243 requests the correspondence information manager 242 to update the correspondence information (Step S58). Upon receipt of this request, the correspondence information manager 242 updates the correspondence information by associating the address space area identification information as the second parameter of the save command with the memory area identification information that identifies the area in the second memory 220 identified as a free area. Operations of Step S51 and onward are thereafter repeated.

If the movement command fetched at Step S53 is a return command (No at Step S54), the data movement controller 243 requests the correspondence information manager 242 to identify memory area identification information associated with the address space area identification information as the second parameter of the return command (Step S59). Upon receipt of this request, the correspondence information manager 242 refers to the correspondence information to thereby identify the memory area identification information associated with the address space area identification information as the second parameter of the return command and notifies the data movement controller 243 of the memory area identification information thus identified. Upon receipt of the notification, the data movement controller 243 controls the switch 230 to switch to the second state (Step S60) and moves data that is stored in the area in the second memory 220 identified by the memory area identification information notified from the correspondence information manager 242 to the area in the first memory 210 identified by the first parameter of the return command (Step S61). The data movement controller 243 then requests the correspondence information manager 242 to update the correspondence information (Step S62). Upon receipt of this request, the correspondence information manager 242 updates the correspondence information by associating the free area identification information with the memory area identification information associated with the address space area identification information as the second parameter of the return command. The operations of Step S51 and onward are thereafter repeated. It is noted that the modification of the first embodiment has been described such that the commands stored in the queue (command storage 250) are processed in order of reception; however, the order of execution of the commands in the queue may be exchanged, if contents in the first memory 210 remain the same at the time of completion of all save and return commands.

Second Embodiment

Figure 10:
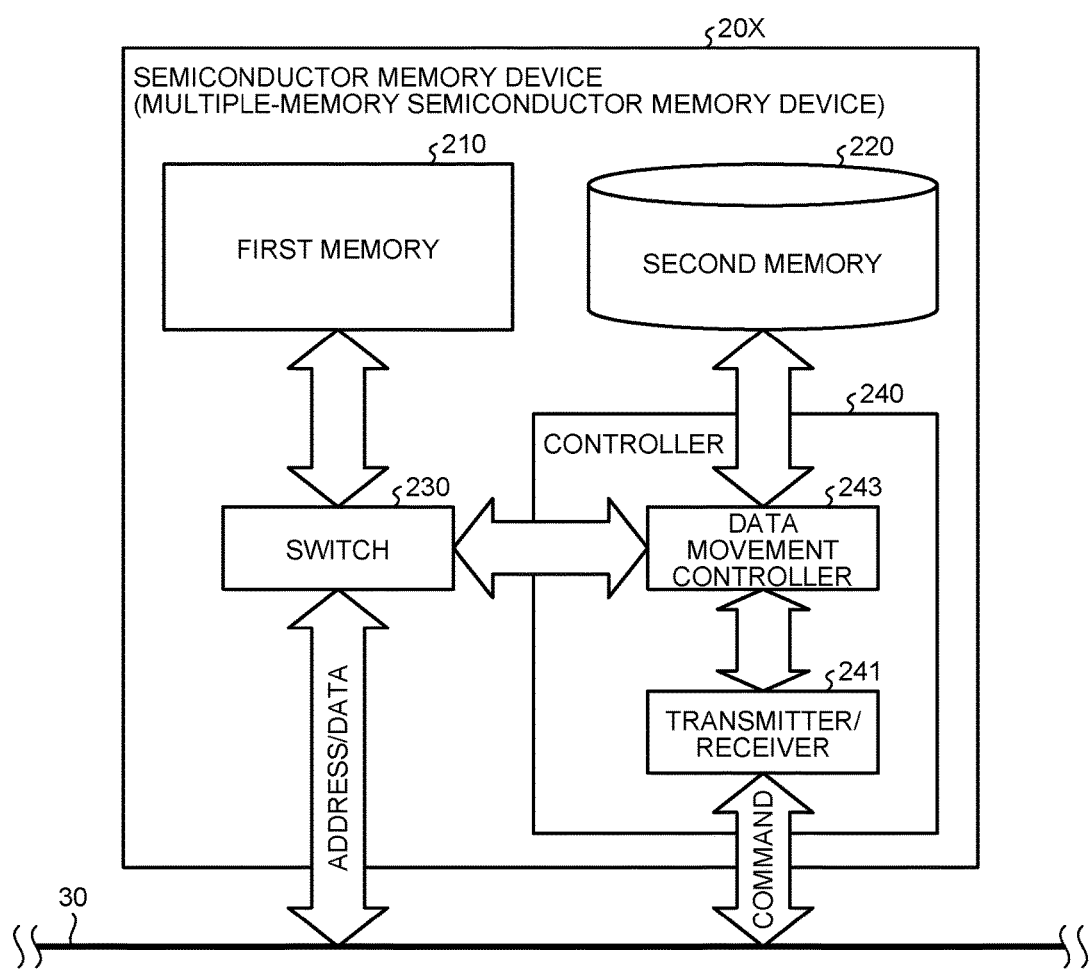
FIG. 10 is a diagram illustrating an exemplary configuration of a semiconductor memory device according to a second embodiment.

A second embodiment will be described below. Descriptions will be omitted as appropriate for portions identical to those in the first embodiment described above. The second embodiment differs from the above-described first embodiment in that the OS on a processor 10 manages the areas in a second memory 220 to which data is saved. As illustrated in FIG. 10, a controller 240 in the second embodiment differs from the controller 240 in the above-described first embodiment in that the controller 240 in the second embodiment does not include the correspondence information manager 242 included in the first embodiment.

In the second embodiment, the OS manages the areas in the second memory 220. Thus, before transmitting the first movement command (a save command or a return command), the processor 10 needs to acquire information on the second memory 220 from a multiple-memory semiconductor memory device 20X. To achieve this end, commands to be transmitted from the processor 10 to the semiconductor memory device 20X further include a second memory information acquiring command that requests to acquire information on the second memory 220.

Types of information requested by the second memory information acquiring command (types of information requested to the semiconductor memory device 20X) include information on the capacity of the second memory 220 and on units in which data is written, and information that indicates a format for specifying a location (address) in which data is to be written. When, for example, the second memory 220 is configured as a NAND flash memory and the areas in the second memory 220 are specified by physical information, the information requested by the second memory information acquiring command includes information that indicates, for example, the number of chips, the number of blocks, a page size, and the number of pages per block. Alternatively, when the areas in the second memory 220 are specified by logical information, the information requested by the second memory information acquiring command includes information that indicates, for example, the page size and the total number of pages.

The information requested by the second memory information acquiring command may further include information on whether the areas in the second memory 220 are specified by logical information or physical information between the multiple-memory semiconductor memory device 20X and the OS. When the areas in the second memory 220 are specified by physical information, the information requested by the second memory information acquiring command may include information that indicates the type of the second memory 220 (information indicating the type of memory, such as whether the second memory 220 is a NAND flash memory, a NOR flash memory, or a ReRAM), an addressing method, and an addressing bit width.

In the second embodiment, the save command and the return command each include a first parameter and a third parameter. The first parameter identifies a specific area out of a plurality of areas included in the first memory 210. The third parameter identifies a specific area out of a plurality of areas included in the second memory 220.

When a save command is received, the controller 240 in the second embodiment moves data stored in an area in the first memory 210 identified by the first parameter of the save command to an area in the second memory 220 identified by the third parameter of the save command. When a return command is received, the controller 240 moves data stored in an area in the second memory 220 identified by the third parameter of the return command to an area in the first memory 210 identified by the first parameter of the return command.

Figure 11:
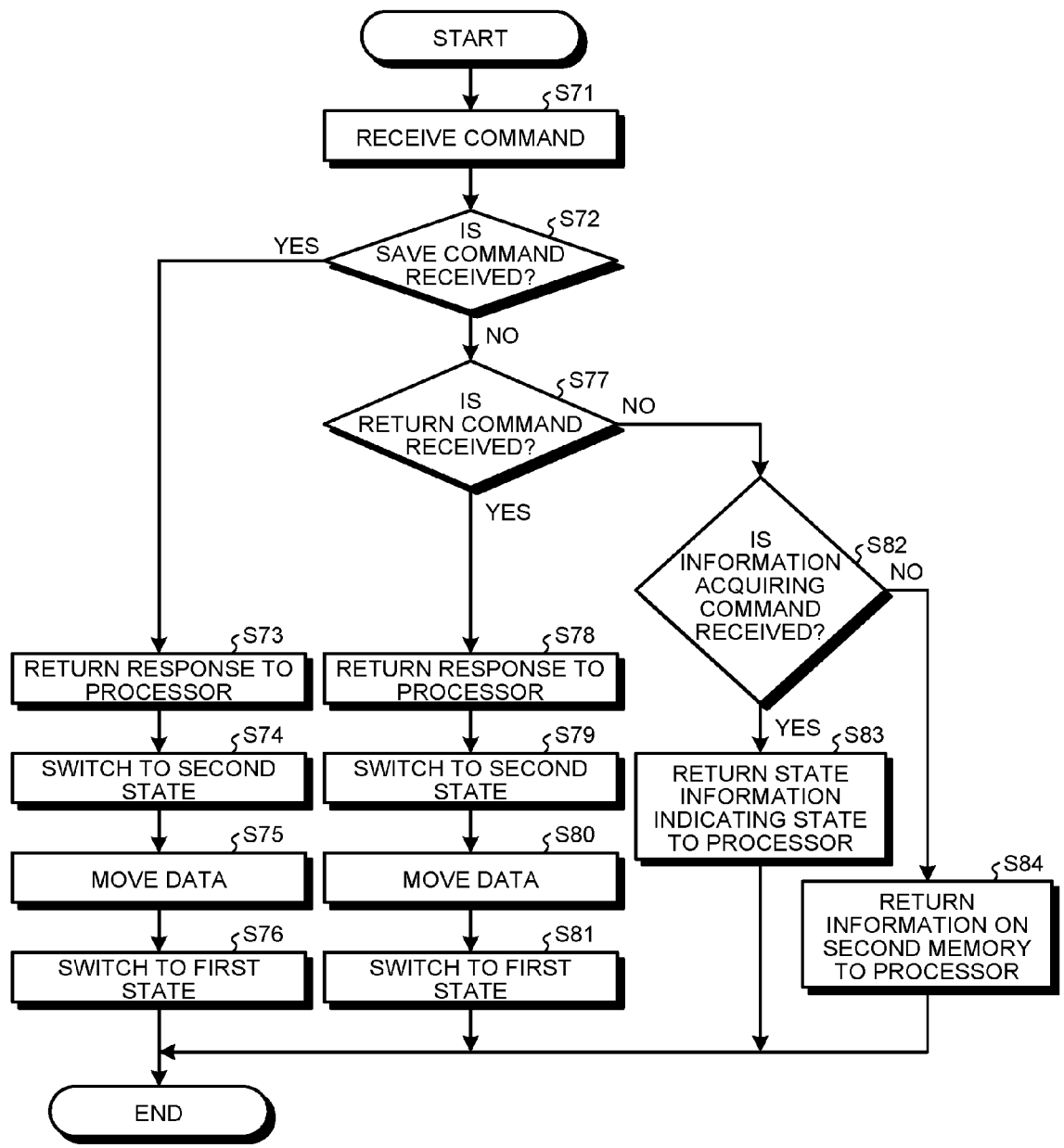
FIG. 11 is a flowchart illustrating exemplary operations performed by a controller according to the second embodiment.

The following describes, with reference to FIG. 11, exemplary operations performed by the controller 240 when the controller 240 receives a command from the processor 10. For convenience sake, the following description assumes that commands received by the processor 10 are categorized into the four types: save command, return command, information acquiring command, and second memory information acquiring command.

A transmitter/receiver 241 receives a command from the processor 10 (Step S71). If the command received at Step S71 is a save command (Yes at Step S72), the transmitter/receiver 241 returns information that indicates that a save command has been received to the processor 10 as a response (Step S73). The data movement controller 243 controls a switch 230 to switch to the second state (Step S74). The data movement controller 243 moves data stored in an area in the first memory 210 identified by the first parameter of the save command received by the transmitter/receiver 241 to an area in the second memory 220 identified by the third parameter of the save command (Step S75). When the movement of the data is completed, the data movement controller 243 controls the switch 230 to switch to the first state (Step S76).

If the command received at Step S71 is a return command (No at Step S72 and Yes at Step S77), the transmitter/receiver 241 returns information that indicates that a return command has been received to the processor 10 as a response (Step S78). The data movement controller 243 controls the switch 230 to switch to the second state (Step S79). The data movement controller 243 moves data stored in an area in the second memory 220 identified by the third parameter of the return command received by the transmitter/receiver 241 to an area in the first memory 210 identified by the first parameter of the return command (Step S80). When the movement of the data is completed, the data movement controller 243 controls the switch 230 to switch to the first state (Step S81).

If the command received at Step S71 is an information acquiring command (No at Step S72, No at Step S77, and Yes at Step S82), the transmitter/receiver 241 returns state information that indicates a current state of the switch 230 (state of the semiconductor memory device 20X) to the processor 10 as a response (Step S83).

If the command received at Step S71 is a second memory information acquiring command (No at Step S72, No at Step S77, and No at Step S82), the transmitter/receiver 241 returns information on the second memory 220 to the processor 10 as a response (Step S84).

Figure 12:
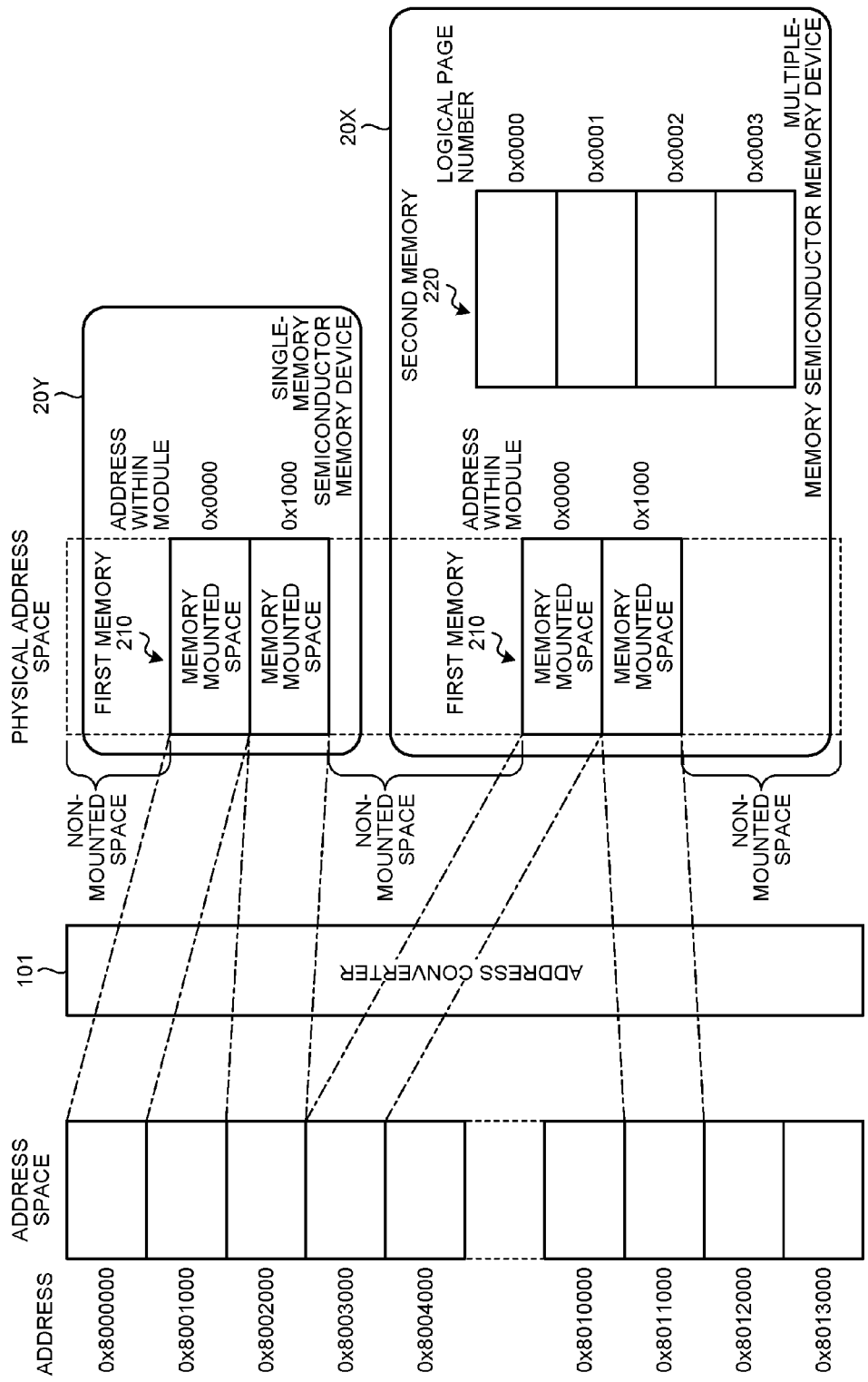
FIG. 12 is a diagram for illustrating specific exemplary operations performed by an information processing apparatus according to the second embodiment.

The following specifically describes, with reference to FIG. 12, general operations of the information processing apparatus 1. For convenience sake, the example illustrated in FIG. 12 illustrates only how a plurality of pages included in an address space (the address space accessed by the processor 10) allocated to a single process (in the example, the process identified by a process ID of "495") are allocated. In FIG. 12, only addresses are used in place of the address space area identification information (in the example, the combination of a process ID and addresses that identify address space areas allocated to the process identified by the process ID). In the following description, the address space refers to the address space that is allocated to the process identified by the process ID of "495" and the address refers to information for identifying a specific page out of a plurality of pages included in the address space.

In the example illustrated in FIG. 12, an address converter 101 functions to cause, out of a plurality of pages included in the address space, a page that starts with an address indicating "0x8000000" and a page that starts with an address indicating "0x8002000" to be allocated to the first memory 210 mounted on a single-memory semiconductor memory device 20Y and a page that starts with an address indicating "0x8003000" and a page that starts with an address indicating "0x8011000" to be allocated to the first memory 210 mounted on the multiple-memory semiconductor memory device 20X.

Figures 13, 14:
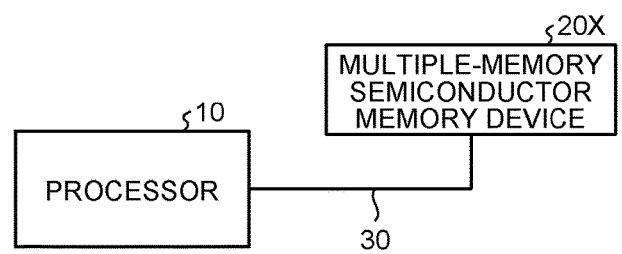
FIG. 13 is a diagram illustrating exemplary correspondence information according to the second embodiment.
FIG. 14 is a diagram illustrating an exemplary configuration of an information processing apparatus according to a third embodiment.

In addition, in the example, a page that starts with an address indicating "0x8004000", a page that starts with an address indicating "0x8013000", and a page that starts with an address indicating "0x8001000" are allocated to (saved in) the second memory 220 mounted on the multiple-memory semiconductor memory device 20X. This save condition is managed by the correspondence information illustrated in FIG. 13. The correspondence information illustrated in FIG. 13 associates a combination (that corresponds to the address space area identification information) of the process ID indicating "495" and an address that indicates the starting address of a specific page out of the pages included in the address space that is allocated to the process identified by the process ID with a logical page number that identifies a specific area out of a plurality of areas included in the second memory 220 (exemplary memory area identification information of the second memory 220). It is noted that, in the example illustrated in FIG. 13, the combination of the process ID indicating "−1" and the virtual address indicating "0xFFFFFFFF" corresponds to the free area identification information and the area in the second memory 220 identified by the logical page number ("4" in the example illustrated in FIG. 13) associated with the combination indicates a free space. The correspondence information illustrated in FIG. 13 is managed by the OS on the processor 10.

In the example illustrated in FIG. 12, the page that starts with an address indicating "0x8010000", the page that starts with an address indicating "0x8012000", and other pages not illustrated are unused pages that are not allocated to any memory.

The correspondence information needs to be initialized when the OS is started to operate the virtual storage mechanism. At initialization, the types of information, the number of entries, and the like to be managed by the correspondence information are established according to the type and capacity, and the applicable addressing method of the second memory 220 mounted on the multiple-memory semiconductor memory device 20X. The OS thus issues a second memory information acquiring command to the multiple-memory semiconductor memory device 20X. In response to the second memory information acquiring command, the OS acquires from the multiple-memory semiconductor memory device 20X information that indicates that the areas in the second memory 220 are specified using logical pages and the number of entries is 4. Using the information thus acquired, the OS organizes the correspondence information as illustrated in FIG. 13. It is noted that contents of the correspondence information are empty in the initial condition.

The following describes operations performed when software that runs on the processor 10 accesses an address within, out of the pages included in the address space, a page that is saved in the second memory 220 (allocated to the second memory 220) and that starts with an address indicating "0x8013000". In this case, because no physical address corresponding to the address accessed by the software exists, the address converter 101 issues a page fault interrupt to the processor 10. The OS follows a predetermined algorithm to select, from among the pages of the address space allocated to the first memory 210, a page to be saved. The following is based on the assumption that the page that starts with the address indicating "0x8003000" has been selected as the page to be saved.

In this example, the OS, which needs to specify by a save command an area that can provide a saving destination in the second memory 220, refers to the correspondence information managed within the OS to thereby search for unused areas (free areas) that can be used as saving destinations. In the example, the OS has only to search for the logical page number in the second memory 220 associated with the combination of the process ID that indicates "−1" and the address that indicates "0xFFFFFFFF". In the example illustrated in FIG. 13, the logical page number indicating "4" is selected.

To save the page that starts with the address indicating "0x8003000", the OS transmits a save command to the multiple-memory semiconductor memory device 20X. As parameters of the save command, the first parameter that identifies an area in the first memory 210 in which the page is to be saved and the third parameter that identifies an area in the second memory 220 as the saving destination are specified. To specify the saving area in the first memory 210, for example, a starting address of addresses in the multiple-memory semiconductor memory device 20X may be specified. In this example, therefore, "0x0000" is specified as the starting address of the addresses in the multiple-memory semiconductor memory device 20X of, out of a plurality of areas included in the first memory 210, the area to which the page that starts with the address indicating "0x8003000" is allocated. The third parameter that identifies the area in the second memory 220 as the saving destination is the logical page number of the second memory 220 indicating "4".

The multiple-memory semiconductor memory device 20X that receives the save command operates in accordance with the flowchart illustrated in FIG. 11. Specifically, when a save command is received (Yes at Step S72), the transmitter/receiver 241 returns information that indicates that a save command has been received to the processor 10 as a response (Step S73). The data movement controller 243 controls the switch 230 to switch to the second state (Step S74). The data movement controller 243 moves data for one page stored in the area in the first memory 210 having a starting address of "0x0000" that is indicated by the first parameter of the save command received by the transmitter/receiver 241 to the area in the second memory 220 identified by a logical page number of "4" indicated by the third parameter of the save command (Step S75). When the movement of the data is completed, the data movement controller 243 controls the switch 230 to switch to the first state (Step S76).

To return the page that includes the address that has caused a page fault, the OS transmits a return command to the multiple-memory semiconductor memory device 20X. For parameters of the return command, a first parameter that identifies an area in the first memory 210 to which the page is to be returned and a third parameter that identifies the area in the second memory 220 in which the page is saved are specified. The area in the first memory 210 to which the page is to be returned is identical to the area in the first memory 210 identified by the first parameter of the corresponding save command. Thus, "0x0000" is specified as the starting address of the addresses in the multiple-memory semiconductor memory device 20X. For the third parameter that identifies the area in the second memory 220 in which the page is saved, the logical page number of the second memory 220 associated with the address that indicates "0x8013000" given to the page that includes the address that has caused the page fault ("2" in the example illustrated in FIG. 13) is specified.

The multiple-memory semiconductor memory device 20X that receives the return command operates in accordance with the flowchart illustrated in FIG. 11. Specifically, if a return command is received, the transmitter/receiver 241 returns information that indicates that a return command has been received to the processor 10 as a response (Step S78). The data movement controller 243 controls the switch 230 to switch to the second state (Step S79). The data movement controller 243 moves data for one page stored in the area in the second memory 220 identified by a logical page number of "2" indicated by the third parameter of the return command received by the transmitter/receiver 241 to the area in the first memory 210 having a starting address of "0x0000" identified by the first parameter of the return command (Step S80). When the movement of the data is completed, the data movement controller 243 controls the switch 230 to switch to the first state (Step S81).

The performance of the foregoing operations allows the software that has developed the page fault to access the address within the page that starts with the virtual address indicating "0x8013000", so that the software can continue processing.

Third Embodiment

A third embodiment will be described below. Descriptions will be omitted as appropriate for portions identical to those in each of the first and the second embodiments described above. Consider, for example, a configuration that includes only one above-described multiple-memory semiconductor memory device 20X connected to the processor 10 as illustrated in FIG. 14. In this configuration, the processor 10 is unable to access the multiple-memory semiconductor memory device 20X while data is being moved inside the multiple-memory semiconductor memory device 20X, so that the processor 10 can only access data stored in its cache memory and is subject to considerably limited operations.

Figure 15:
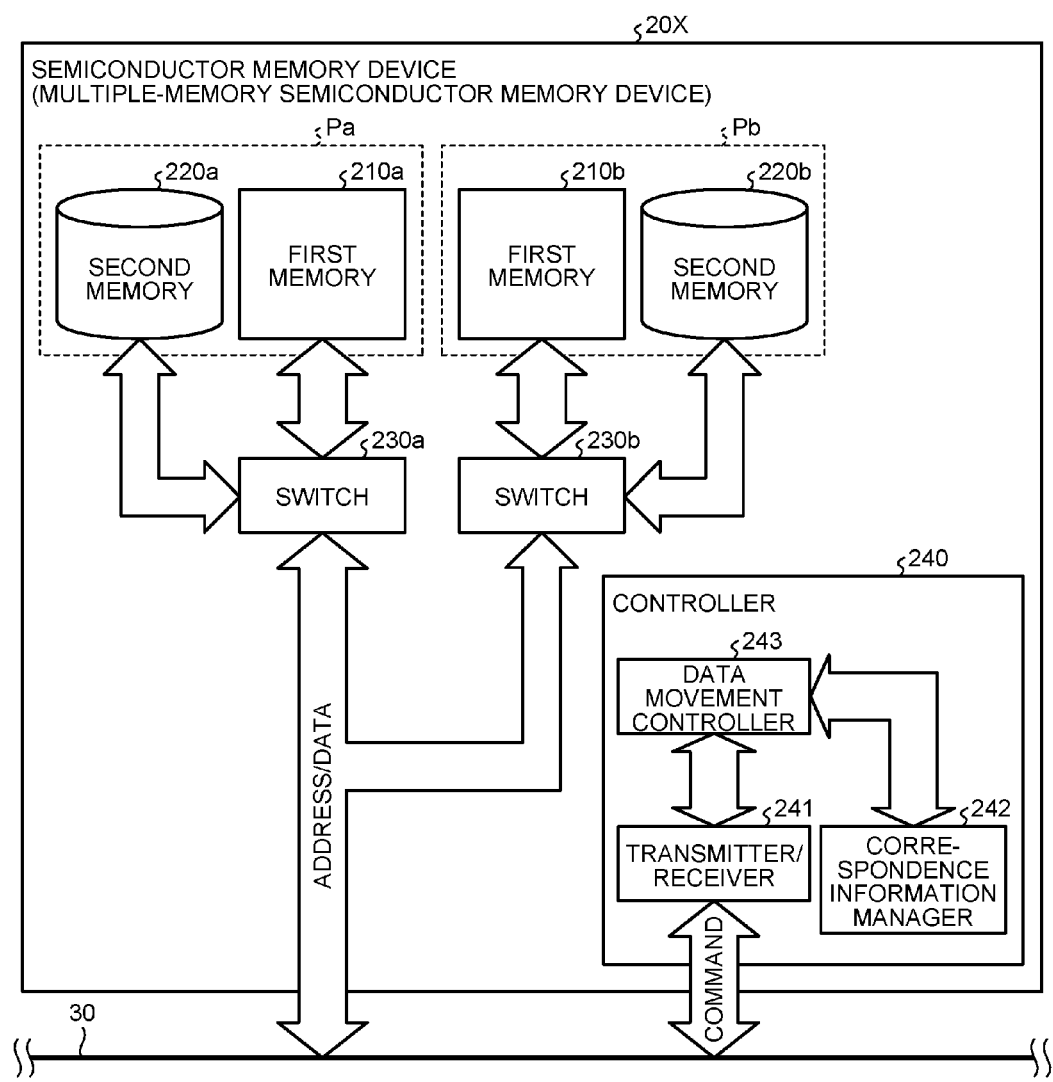
FIG. 15 is a diagram illustrating an exemplary configuration of a semiconductor memory device according to the third embodiment.

Thus, the third embodiment includes a plurality of sets of a first memory 210 and a second memory 220 disposed inside a multiple-memory semiconductor memory device 20X. FIG. 15 illustrates an exemplary hardware configuration of the semiconductor memory device 20X on which two sets (Pa and Pb) are mounted. In the example illustrated in FIG. 15, the first memory 210 included in the set Pa is denoted as a "first memory 210a" and the second memory 220 included in the set Pa is denoted as a "second memory 220a". Similarly, the first memory 210 included in the set Pb is denoted as a "first memory 210b" and the second memory 220 included in the set Pb is denoted as a "second memory 220b".

The configuration in the third embodiment includes a plurality of switches 230 and each of the switches 230 has a one-to-one association with a corresponding set. In the example illustrated in FIG. 15, the switch 230 that is associated with the set Pa is denoted as a "switch 230a" and the switch 230 that is associated with the set Pb is denoted as a "switch 230b". The switch 230a switches between a first state and a second state. Specifically, in the first state, the first memory 210a is connected to the processor 10 and the second memory 220a is not connected to the processor 10 (a first state associated with the set Pa). In the second state, the first memory 210a is connected to the second memory 220a and the processor 10 is connected to neither the first memory 210a nor the second memory 220a (a second state associated with the set Pa). Similarly, the switch 230b switches between a first state and a second state. Specifically, in the first state, the first memory 210b is connected to the processor 10 and the second memory 220b is not connected to the processor 10 (a first state associated with the set Pb). In the second state, the first memory 210b is connected to the second memory 220b and the processor 10 is connected to neither the first memory 210b nor the second memory 220b (a second state associated with the set Pb).

Specifically, the configuration is only required to include a plurality of switches that have a one-to-one association with the respective sets, each set being composed of either one of the first memories 210 and either one of the second memories 220, and that switch between various states including between the first state and the second state. In the first state, the first memory 210 included in the corresponding set is connected to the processor 10 and the second memory 220 included in the corresponding set is not connected to the processor 10. In the second state, in which the first memory 210 included in the corresponding set is connected to the second memory 220 included in the corresponding set and the processor 10 is connected to neither the first memory 210 included in the corresponding set nor the second memory 220 included in the corresponding set.

In the third embodiment, when a movement command (a save command or a return command) that requests movement of data between the first memory 210 included in either one of the sets and the second memory 220 included in the one of the sets is received from the processor 10, a controller 240 controls the switch associated with the corresponding set to switch to the second state, thereby moving the data between the first memory 210 and the second memory 220. More specifically, the movement command includes a first request (a save command) that requests movement of data stored in the first memory 210 included in either one of the sets to the second memory 220 included in the one of the sets and a second request (a return command) that requests movement of data stored in the second memory 220 included in either one of the sets to the first memory 210 included in the one of the sets. When the first request is received from the processor 10, the controller 240 identifies a specific switch 230 that is associated with the set involved in the first request, controls the corresponding switch 230 to switch to the second state, and moves data stored in the first memory 210 included in the set involved in the first request to the second memory 220 included in the set involved in the first request. Similarly, when the second request is received from the processor 10, the controller 240 identifies a specific switch 230 that is associated with the set involved in the second request, controls the corresponding switch 230 to switch to the second state, and moves data stored in the second memory 220 included in the set involved in the second request to the first memory 210 included in the set involved in the second request. Specific operations may be considered to be similar to those in each of the first and the second embodiments described above.

The third embodiment can limit, among the first memories 210, only part of the first memories 210 that cannot be accessed by the processor 10 during movement of data with respect to the corresponding second memory 220, thereby allowing another first memory 210 to be accessed from the processor 10. Restrictions on operations of the processor 10 can thus be considerably reduced even during movement of data between the limited first memory 210 and the second memory 220 associated therewith.

The third embodiment may be combined with the above-described first embodiment or with the above-described second embodiment. Specific details of the portions in the respective embodiments are as described above.

For example, when the third embodiment is combined with the first embodiment described above, the multiple-memory semiconductor memory device 20X further includes a correspondence information manager that stores, for each of the sets, a plurality of pieces of correspondence information, each piece of correspondence information associating memory area identification information that identifies a specific area out of a plurality of areas included in the second memory 220 included in the set with address space area identification information that identifies a specific area out of a plurality of areas included in an address space. The first request (save command) and the second request (return command) each include a first parameter that identifies a specific area out of a plurality of areas included in the first memory 210 included in either one of the sets and a second parameter that indicates the address space area identification information.

When the first request is received, the controller 240 identifies a free area in the second memory 220 included in the set involved in the first request, moves data stored in the area in the first memory 210 identified by the first parameter of the first request to the free area thus identified in the second memory 220, and updates the correspondence information by associating the address space area identification information as the second parameter of the first request with the memory area identification information that identifies the area in the second memory 220 to which the data has been moved. In contrast, when the second request is received, the controller 240 refers to the correspondence information of the set involved in the second request and identifies the memory area identification information that is associated with the address space area identification information as the second parameter of the second request. The controller 240 then moves the data stored in the area in the second memory 220 identified by the memory area identification information thus identified to the area in the first memory 210 identified by the first parameter of the second request. The controller 240 then manages the area in the second memory 220 from which the data has been moved as a free area.

As in the above-described first embodiment, when the area in the second memory 220 identified by the memory area identification information included in the correspondence information is a free area, the correspondence information may be configured to indicate that the memory area identification information of the second memory 220 is associated with the free area identification information that identifies a free area. In this configuration, when the first request is received, the controller 240 identifies the memory area identification information associated with the free area identification information using the correspondence information of the set involved in the first request, moves the data stored in the area in the first memory 210 identified by the first parameter of the first request to the area in the second memory 220 identified by the memory area identification information thus identified, and updates the correspondence information by associating the address space area identification information as the second parameter of the first request with the memory area identification information that identifies the area in the second memory 220 to which the data has been moved. In contrast, when the second request is received, the controller 240 refers to the correspondence information of the set involved in the second request and identifies the memory area identification information that is associated with the address space area identification information as the second parameter of the second request. The controller 240 then moves the data stored in the area in the second memory 220 identified by the memory area identification information thus identified to the area in the first memory 210 identified by the first parameter of the second request. The controller 240 further updates the correspondence information by associating the free area identification information with the memory area identification information that identifies the area in the second memory 220 from which the data has been moved.

When the third embodiment is combined with the second embodiment described above, managing the correspondence information is not required as in the second embodiment. In this case, the first request and the second request each include a first parameter and a third parameter. The first parameter identifies a specific area out of a plurality of areas included in the first memory 210 included in either one of the sets. The third parameter identifies a specific area out of a plurality of areas included in the second memory 220 included in the one of the sets.

When the first request is received, the controller 240 moves data stored in an area in the first memory 210 identified by the first parameter of the first request to an area in the second memory 220 identified by the third parameter of the first request. When the second request is received, the controller 240 moves data stored in an area in the second memory 220 identified by the third parameter of the second request to an area in the first memory 210 identified by the first parameter of the second request.

It is noted that, when the third embodiment is combined with the second embodiment described above, the processor 10 needs to identify a configuration of the sets in the multiple-memory semiconductor memory device 20X before issuing the movement command. To achieve this end, the types of commands transmitted from the processor 10 to the semiconductor memory device 20X further include a set configuration information acquiring command that requests acquisition of information on the configuration of the sets. When a set configuration information acquiring command is received from the processor 10, a transmitter/receiver 241 returns information on the configuration of the sets to the processor 10 as a response.

Modification of Third Embodiment

Figure 16:
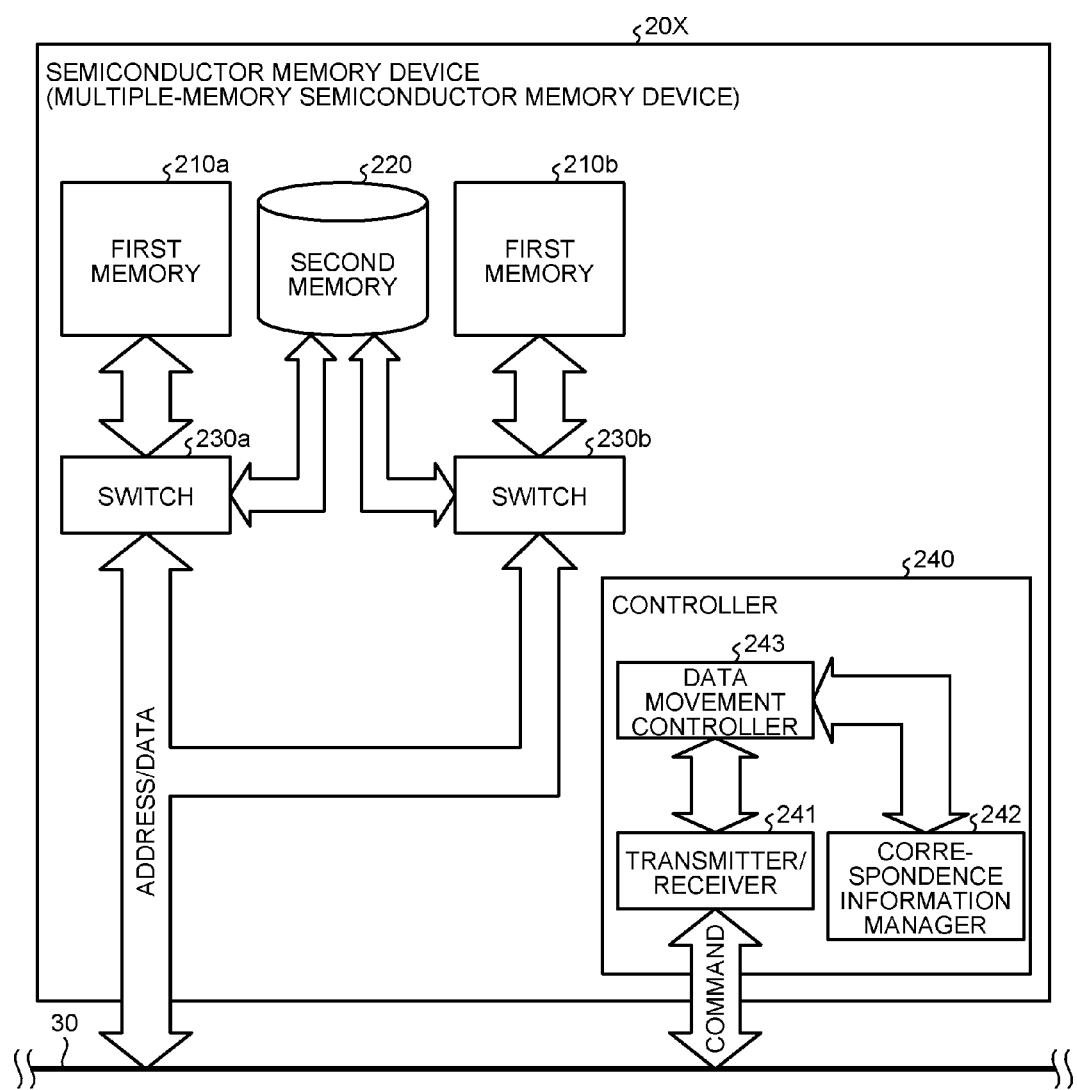
FIG. 16 is a diagram illustrating an exemplary configuration of a semiconductor memory device according to a modification of the third embodiment.

A configuration is possible in which one second memory 220 is shared as a saving destination by a plurality of first memories 210 as illustrated, for example, in FIG. 16. The example illustrated in FIG. 16 includes a plurality of switches 230 and each of the switches 230 has a one-to-one association with a corresponding one of the first memories 210. Specifically, the configuration is only required to include a plurality of switches 230, each being associated with a corresponding one of the first memories 210, in order to achieve, for each of the first memories 210, switching between a first state in which the first memory 210 is connected to the processor and the second memory 220 is not connected to the processor 10 and a second state in which the first memory 210 is connected to the second memory 220 and the processor 10 is connected to neither the first memory 210 nor the second memory 220.

In this example, when a movement command that requests movement of data between either one of the first memories 210 and the second memory 220 is received from the processor 10, a controller 240 controls a specific switch 230 that is associated with the one of the first memories 210 involved in the movement command to thereby switch to the second state, thereby moving the data between the first memory 210 and the second memory 220. More specifically, the movement command includes a first request (a save command) that requests movement of data stored in either one of the first memories 210 to the second memory 220 and a second request (a return command) that requests movement of data stored in the second memory 220 to either one of the first memories 210. When the first request is received from the processor 10, the controller 240 identifies a specific switch 230 that is associated with the first memory 210 involved in the first request, controls the switch 230 to switch to the second state, and moves data stored in the first memory 210 to the second memory 220. Alternatively, when the second request is received from the processor 10, the controller 240 identifies a specific switch 230 that is associated with the first memory 210 involved in the second request, controls the switch 230 to switch to the second state, and moves data stored in the second memory 220 to the first memory.

The modification of the third embodiment may be combined with the above-described first embodiment or with the above-described second embodiment. For example, when the modification of the third embodiment is combined with the first embodiment described above, the first request (save command) and the second request (return command) each include a first parameter that identifies a specific area out of a plurality of areas included in either one of the first memories 210 and a second parameter that indicates address space area identification information that identifies a specific area out of a plurality of areas included in an address space. Specific details of operations performed by the controller 240 are similar to those in the first embodiment described above.

When, for example, the modification of the third embodiment is combined with the second embodiment described above, the first request (save command) and the second request (return command) each include a first parameter and a third parameter. The first parameter identifies a specific area out of a plurality of areas included in either one of the first memories 210. The third parameter identifies a specific area out of a plurality of areas included in the second memory 220. Specific details of operations performed by the controller 240 are similar to those in the first embodiment described above.

With data processing applications that handle a vast amount of data and application programs such as in-memory databases, faster operations may be achieved with a reduced number of data exchanges, if the application program can identify the data area to which data is to be saved, thereby directly issuing a save or return command instead of letting the OS save or return the data in main memory. A configuration may therefore be possible in which the OS provides a system call for allowing the application to issue a movement command so that the application can directly send the movement command to the multiple-memory semiconductor memory device 20X. Because a conversion mechanism between the virtual address and the physical address of the OS does not involve in the saving or returning of the data within the multiple-memory semiconductor memory device 20X in this case, the application program is to manage mapping of the data resident in the first memory 210 to a specific portion in the entire data managed by the application program.

The first to the third embodiments and the modifications described above may be combined with each other in any appropriate manner.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor memory device comprising:
   a first memory;
   a second memory;
   a switch to switch between various states including between a first state and a second state, wherein the first state is a state in which the first memory is connected to a host device that reads data from and writes data to the first memory and the second memory is not connected to the host device, and the second state is a state in which the first memory is connected to the second memory and the host device is connected to neither the first memory nor the second memory; and
   a controller to direct, upon receiving a movement command from the host device, the switch to switch to the second state to move data between the first memory and the second memory, wherein
   the switch is connected to the first memory, the second memory, and the host device.

2. The semiconductor memory device according to claim 1, wherein
in a case where the movement command requests movement of data stored in the first memory to the second memory, the controller directs the switch to switch to the second state to move data stored in the first memory to the second memory, and
in a case where the movement command requests movement of data stored in the second memory to the first memory, the controller directs the switch to switch to the second state to move data stored in the second memory to the first memory.

3. The semiconductor memory device according to claim 2, further comprising a correspondence information manager configured to store a plurality of pieces of correspondence information, each piece of correspondence information associating memory area identification information of the second memory with address space area identification information, the memory area identification information identifying a specific area out of a plurality of areas included in the second memory, and the address space area identification information identifying a specific area out of a plurality of areas included in an address space accessed by the host device, wherein
as the movement commands, a first request and a second request each include a first parameter for identifying a specific area out of a plurality of areas included in the first memory and a second parameter indicating the address space area identification information, the first request requesting movement of data stored in the first memory to the second memory, the second request requesting movement of data stored in the second memory to the first memory, and
in response to receiving the first request, the controller finds a free area in the second memory, moves data stored in an area in the first memory identified by the first parameter of the first request to the found free area in the second memory, and updates the correspondence information so that the address space area identification information as the second parameter of the first request is associated with the memory area identification information that identifies the area in the second memory to which the data is moved, and
in response to receiving the second request, the controller finds the memory area identification information associated with the address space area identification information as the second parameter of the second request by referring to the correspondence information, moves data stored in the area in the second memory identified by the found memory area identification information to an area in the first memory identified by the first parameter of the second request, and manages, as a free area, the area in the second memory from which the data is moved.

4. The semiconductor memory device according to claim 3, wherein
when an area in the second memory identified by the memory area identification information is a free area, the correspondence information represents information in which the memory area identification information is associated with free area identification information,
in response to receiving the first request, the controller finds memory area identification information associated with the free area identification information by referring to the correspondence information, moves data stored in an area in the first memory identified by the first parameter of the first request to an area in the second memory identified by the found memory area identification information, and updates the correspondence information so that the address space area identification information as the second parameter of the first request is associated with the memory area identification information for identifying the area in the second memory to which the data is moved, and
in response to receiving the second request, the controller finds the memory area identification information associated with the address space area identification information as the second parameter of the second request by referring to the correspondence information, moves data stored in an area in the second memory identified by the found memory area identification information to an area in the first memory identified by the first parameter of the second request, and updates the correspondence information so that the free area identification information is associated with the memory area identification information for identifying the area in the second memory from which the data is moved.

5. The semiconductor memory device according to claim 2, wherein
as the movement commands, a first request and a second request each include a first parameter for identifying a specific area out of a plurality of areas included in the first memory and a third parameter for identifying a specific area out of a plurality of areas included in the second memory, the first request requesting movement of data stored in the first memory to the second memory, the second request requesting movement of data stored in the second memory to the first memory, and
in response to receiving the first request, the controller moves data stored in an area in the first memory identified by the first parameter of the first request to an area in the second memory identified by the third parameter of the first request, and
in response to receiving the second request, the controller moves data stored in an area in the second memory identified by the third parameter of the second request to an area in the first memory identified by the first parameter of the second request.

6. The semiconductor memory device according to claim 1, further comprising a command storage configured to store the movement command received from the host device in order of reception, wherein
the controller fetches the movement command stored in the command storage one by one to perform control according to the fetched movement command.

7. The semiconductor memory device according to claim 6, wherein the controller fetches the movement command stored in the command storage one by one, starting with a starting movement command.

8. The semiconductor memory device according to claim 1, wherein the first memory is connected to the host device via the switch in the first state.

9. The semiconductor memory device according to claim 1, wherein
the first memory stores first data received from the host device in the first state, and
the second memory stores the first data received from the first memory in the second state.

10. A semiconductor memory device comprising:
a plurality of first memories;
a plurality of second memories;
a plurality of switches, each switch having a one-to-one association with a corresponding set of any one of the first memories and any one of the second memories, the switches switching between various states including between a first state and a second state, the first state being a state in which the first memory included in the corresponding set is connected to a host device that reads data from and writes data to the first memory and the second memory included in the corresponding set is not connected to the host device, the second state being a state in which the first memory included in the corresponding set is connected to the second memory included in the corresponding set and the host device is connected to neither the first memory included in the corresponding set nor the second memory included in the corresponding set; and a controller to direct, upon receiving a movement command from the host device, the switch associated with any one of the sets to switch to the second state to move data between the first memory included in the one of the sets and the second memory included in the one of the sets, wherein the switch is connected to the first memory, the second memory, and the host device.

11. The semiconductor memory device according to claim 10, wherein the first memory is connected to the host device via the switch in the first state.

12. The semiconductor memory device according to claim 10, wherein the first memory stores first data received from the host device in the first state, and the second memory stores the first data received from the first memory in the second state.

13. A semiconductor memory device comprising:

a plurality of first memories;

a second memory;

a plurality of switches corresponding to the respective first memories, each switch switching between various states including between a first state and a second state, the first state being a state in which the corresponding first memory is connected to a host device that reads data from and writes data to the corresponding first memory and the second memory is not connected to the host device, the second state being a state in which the corresponding first memory is connected to the second memory and the host device is connected to neither the corresponding first memory nor the second memory; and a controller to direct, upon receiving a movement command from the host device, any one of the switches to move data between the corresponding first memory and the second memory, wherein the switch is connected to the first memory, the second memory, and the host device.

14. The semiconductor memory device according to claim 13, wherein the first memory is connected to the host device via the switch in the first state.

15. The semiconductor memory device according to claim 13, wherein the first memory stores first data received from the host device in the first state, and the second memory stores the first data received from the first memory in the second state.

16. A semiconductor memory device comprising:

a first memory connectable to a host device;

a second memory connectable to the first memory;

a switch to switch between various states including between a first state in which the first memory is connected to the host device to move data between the host device and the first memory, and a second state in which the first memory is connected to the second memory to move data between the first memory and the second memory; and a controller to control, upon receiving a movement command from the host device, the switch to switch between the first state and the second state, wherein the switch is connected to the first memory, the second memory, and the host device.

17. The semiconductor memory device according to claim 16, wherein the first memory is connected to the host device via the switch in the first state.

18. The semiconductor memory device according to claim 16, wherein the first memory stores first data received from the host device in the first state, and the second memory stores the first data received from the first memory in the second state.

* * * * *